US011821119B2

(12) United States Patent
Little et al.

(10) Patent No.: US 11,821,119 B2
(45) Date of Patent: *Nov. 21, 2023

(54) HIGH TEMPERATURE TREATED MEDIA

(71) Applicant: Donaldson Company, Inc., Minneapolis, MN (US)

(72) Inventors: Daniel Little, Minnetonka, MN (US); Robert M. Rogers, Minnetonka, MN (US); Derek O. Jones, Andover, MN (US); Keh B. Dema, Johnson City, TN (US)

(73) Assignee: DONALDSON COMPANY, INC., Minneapolis, MN (US)

( * ) Notice: Subject to any disclaimer, the term of this patent is extended or adjusted under 35 U.S.C. 154(b) by 190 days.

This patent is subject to a terminal disclaimer.

(21) Appl. No.: 17/362,453

(22) Filed: Jun. 29, 2021

(65) Prior Publication Data

US 2021/0362081 A1  Nov. 25, 2021

Related U.S. Application Data

(62) Division of application No. 13/422,349, filed on Mar. 16, 2012, now Pat. No. 11,180,876.

(60) Provisional application No. 61/454,172, filed on Mar. 18, 2011, provisional application No. 61/454,171, filed on Mar. 18, 2011.

(51) Int. Cl.
*B01D 39/16* (2006.01)
*B01D 39/18* (2006.01)
*D04H 1/435* (2012.01)
*D04H 1/54* (2012.01)
*D04H 1/55* (2012.01)
*D04H 1/541* (2012.01)
*D04H 5/04* (2006.01)

(52) U.S. Cl.
CPC .......... *D04H 1/435* (2013.01); *B01D 39/163* (2013.01); *B01D 39/1623* (2013.01); *B01D 39/18* (2013.01); *D04H 1/54* (2013.01); *D04H 1/5412* (2020.05); *D04H 1/5418* (2020.05); *D04H 1/55* (2013.01); *D04H 5/04* (2013.01); *B01D 2239/0216* (2013.01); *B01D 2239/0457* (2013.01); *B01D 2239/064* (2013.01); *B01D 2239/0618* (2013.01); *B01D 2239/0636* (2013.01); *B01D 2239/1216* (2013.01); *B01D 2239/1225* (2013.01); *B01D 2239/1233* (2013.01); *B01D 2239/1258* (2013.01); *D10B 2201/02* (2013.01); *D10B 2331/04* (2013.01); *D10B 2401/063* (2013.01); *D10B 2505/04* (2013.01)

(58) Field of Classification Search
None
See application file for complete search history.

(56) References Cited

U.S. PATENT DOCUMENTS

| | | | |
|---|---|---|---|
| 2,764,602 | A | 9/1956 | Ahlbrecht et al. |
| 2,764,603 | A | 9/1956 | Ahlbrecht et al. |
| 2,803,656 | A | 8/1957 | Ahlbrecht et al. |
| 3,147,064 | A | 9/1964 | Brown et al. |
| 3,255,131 | A | 6/1966 | Ahlbrecht et al. |
| 3,450,755 | A | 6/1969 | Ahlbrecht |
| 4,069,158 | A | 1/1978 | Bertocchio et al. |
| 4,069,244 | A | 1/1978 | Mueller |
| 4,090,967 | A | 5/1978 | Falk |
| 4,161,590 | A | 7/1979 | Mueller |
| 4,161,602 | A | 7/1979 | Mueller |
| 5,167,765 | A | 12/1992 | Nielsen et al. |
| 5,509,430 | A | 4/1996 | Berger |
| 5,580,459 | A | 12/1996 | Powers et al. |
| 5,580,499 | A | 12/1996 | Uy |
| 5,851,355 | A | 12/1998 | Goettmann |
| 6,251,224 | B1 | 6/2001 | Dong |
| 6,258,196 | B1 | 7/2001 | Suzuki et al. |
| 6,352,947 | B1 | 3/2002 | Haley et al. |
| 6,851,164 | B2 | 2/2005 | Andersen |
| 6,867,346 | B1 | 3/2005 | Dopps et al. |
| 6,872,233 | B2 | 3/2005 | Smithies et al. |
| 7,030,046 | B2 | 4/2006 | Wong et al. |
| 7,081,423 | B2 | 7/2006 | Abed et al. |
| 7,115,151 | B2 | 10/2006 | Smithies et al. |

(Continued)

FOREIGN PATENT DOCUMENTS

| | | |
|---|---|---|
| EP | 0070164 | 1/1983 |
| EP | 0465203 | 1/1992 |

(Continued)

OTHER PUBLICATIONS

"PCT International Search Report and Written Opinion" from International Application No. PCT/US12/29455, corresponding to U.S. Patent (our file 758,7147WOU1), dated May 24, 2012, pp. 1-15.

(Continued)

*Primary Examiner* — Benjamin M Kurtz
(74) *Attorney, Agent, or Firm* — Mueting Raasch Group

(57) ABSTRACT

A thermally bonded filtration media that can be used in high temperature conditions in the absence of any loss of fiber through thermal effects or mechanical impact on the fiber components is disclosed. The filter media can be manufactured and used in a filter unit or structure, can be placed in a stream of removable fluid, and can remove a particulate load from the mobile stream at an increased temperature range. The combination of bi-component fiber, other filter media fiber, and other filtration additives provides an improved filtration media having unique properties in high temperature, high performance applications.

15 Claims, No Drawings

(56) References Cited

U.S. PATENT DOCUMENTS

| | | |
|---|---|---|
| 7,309,372 B2 | 12/2007 | Kahlbaugh et al. |
| 7,314,497 B2 | 1/2008 | Kahlbaugh et al. |
| 7,410,683 B2 | 8/2008 | Curro et al. |
| 7,465,373 B2 | 12/2008 | Graef et al. |
| 7,465,684 B2 | 12/2008 | Hurley et al. |
| 7,553,532 B2 | 6/2009 | Turner et al. |
| 7,682,686 B2 | 3/2010 | Curro et al. |
| 7,727,915 B2 | 6/2010 | Skirius et al. |
| 2005/0054253 A1 | 3/2005 | Minoguchi et al. |
| 2005/0091947 A1 | 5/2005 | Smithies et al. |
| 2005/0142966 A1 | 6/2005 | Quincy et al. |
| 2005/0227563 A1 | 10/2005 | Bond |
| 2005/0227564 A1 | 10/2005 | Bond et al. |
| 2006/0052023 A1 | 3/2006 | Lauridsen et al. |
| 2006/0058746 A1 | 3/2006 | Poccia et al. |
| 2006/0065380 A1 | 3/2006 | Garnier et al. |
| 2006/0081348 A1 | 4/2006 | Graef et al. |
| 2006/0096263 A1 | 5/2006 | Kahlbaugh et al. |
| 2006/0154547 A1 | 7/2006 | Hurley et al. |
| 2006/0206071 A1 | 9/2006 | Graef et al. |
| 2006/0242933 A1 | 11/2006 | Webb et al. |
| 2007/0039300 A1 | 2/2007 | Kahlbaugh et al. |
| 2007/0175195 A1 | 8/2007 | Skirius et al. |
| 2007/0220852 A1 | 9/2007 | Lifshutz et al. |
| 2007/0232179 A1 | 10/2007 | Polat et al. |
| 2007/0232180 A1 | 10/2007 | Polat et al. |
| 2007/0295659 A1 | 12/2007 | Rygalski et al. |
| 2008/0003912 A1 | 1/2008 | Pourdeyhimi et al. |
| 2008/0022645 A1 | 1/2008 | Skirius et al. |
| 2008/0050565 A1 | 2/2008 | Gross et al. |
| 2008/0105612 A1 | 5/2008 | Chappas et al. |
| 2008/0119807 A1 | 5/2008 | Curro et al. |
| 2008/0121461 A1 | 5/2008 | Gross et al. |
| 2008/0217809 A1 | 9/2008 | Zhao et al. |
| 2009/0044702 A1 | 2/2009 | Adamek et al. |
| 2009/0050578 A1 | 2/2009 | Israel et al. |
| 2009/0092809 A1 | 4/2009 | Hurley et al. |
| 2009/0131909 A1 | 5/2009 | Björnberg et al. |
| 2009/0159224 A1 | 6/2009 | Chou et al. |
| 2009/0163102 A1 | 6/2009 | Drapela et al. |
| 2009/0233039 A1 | 9/2009 | Turner et al. |
| 2009/0272084 A1 | 11/2009 | Healey et al. |
| 2009/0312731 A1 | 12/2009 | Steindl et al. |
| 2010/0029161 A1 | 2/2010 | Pourdeyhimi |
| 2010/0066121 A1 | 3/2010 | Gross et al. |
| 2010/0080993 A1 | 4/2010 | Privitera et al. |
| 2010/0095846 A1 | 4/2010 | Skirius et al. |
| 2012/0234748 A1 | 9/2012 | Little et al. |

FOREIGN PATENT DOCUMENTS

| | | |
|---|---|---|
| JP | H04-202895 | 7/1992 |
| JP | H09-228216 | 9/1997 |
| JP | H11-291377 | 10/1999 |
| JP | 2003-117319 | 4/2003 |
| JP | 2008-518772 | 6/2008 |
| JP | 2009-154134 | 7/2009 |
| WO | 2006/052732 | 5/2006 |
| WO | 2007/070064 | 6/2007 |

OTHER PUBLICATIONS

Hutten, excerpts from Handbook of Nonwoven Filter Media, Butterworth-Heinemann, an imprint of Elsevier: Burlington, MA; 2007. Cover page, publisher's page, and pp. 151-152 and 245-253.

Sczostak, "Cotton Linters: An Alternative Cellulosic Raw Material", 2009, Macromol. Symp., 280:45-53.

Trevira Product Information, "Type programme: Trevira staple fibres for nonwoven", Trevira GmbH, Hattersheim, Germany, 7 pages. Cited by Examiner on Nov. 24, 2015.

Wicks and Wicks Jr., "Blocked Isocyanates III: Part A, Mechanisms and chemistry", 1999, Progress in Organic Coatings, 36(3):148-172.

Wikipedia, "Polyethylene terephthalate", 16 pages. Available online at https://en.wikipedia.org/wiki/Polyethylene_terephthalate. Obtained from the internet Nov. 18, 2015, 16 pages.

HIGH TEMPERATURE TREATED MEDIA

CROSS REFERENCE TO RELATED APPLICATIONS

This application is a divisional of U.S. patent application Ser. No. 13/422,349, filed Mar. 16, 2012, which claims the benefit of U.S. Provisional Patent Application No. 61/454,171, filed Mar. 18, 2011, and of U.S. Provisional Patent Application No. 61/454,172, filed Mar. 18, 2011, the contents of which are herein incorporated by reference in their entirety.

FIELD OF THE INVENTION

The invention relates to a thermally formed composition in the form of a web or layer, a filtration medium or media and a filter structure having improved properties. Improved permeability, high temperature strength, mechanical stability and high capacity for aerosol or particulate removal from a moving fluid, including air, gas or liquid streams can result from the thermally formed composition. The filter media can be formed into a variety of filter units in the form of filtration panels, cartridges, inserts, pleated forms, etc.

BACKGROUND OF THE INVENTION

Non-woven fibrous layers, webs or media have been manufactured for many years for many uses including filtration. An array of media that has an acceptable set of properties are available. Complexities inherent in the manufacture of these media increase costs and reduce flexibility in product offerings.

Such non-woven fibrous media are useful in a variety of applications, including filtration of aerosol or solid particulates from air or liquid streams, such as dust and mist filtration, crankcase ventilation (CCV) and open crankcase ventilation (OCV). Such media can also be formed into layered media structures.

Non-woven fibrous media can be made of natural or synthetic fibers and can be formed into a variety of media types. One recent media type is shown in U.S. Pat. Nos. 7,314,497, 7,309,372 and 5,580,499 and generally comprise a bi-component fiber and glass fibers that are thermally bonded into a web. Such media have useful pore size and filtration efficiencies from the combined fiber component.

Many filter media grades, including bi-component fiber media, are being used at temperatures greater than about 100° C. and are more recently being used at temperatures greater than about 130° C. to 150° C. and more. Future media will be exposed to higher temperatures and other harsh operating conditions. At such temperatures and under such conditions, fibrous media bonded by thermoplastic resins and thermoplastic bi-component media can soften or fail. Such softened structures can have reduced filtration properties, can mechanically fail during use or as a result of softening or reduced tensile strength, portions of the filtration media can be lost from the media and can enter the fluid stream causing downstream difficulties. Such problems can occur in any application experiencing consistently elevated operating temperatures or experiencing periodic temperature extremes. Such media requires filtration properties sufficient to remove particulate while maintaining low pressure drop across the media. The media used in CCV (Closed crankcase ventilation) or OCV (open crankcase ventilation) applications need to rapidly drain accumulated oil liquids.

One environment of interest is "under-hood" filtration that is currently becoming more common. Due to environmental concerns and other design characteristics, various types of engine filters are more commonly used inside an engine compartment and adjacent to engine components. In modern engines, and in particular diesel engines, under-hood temperatures continue to pose operating challenges to filtration applications, including air filtration, oil filtration, hydraulic filtration, crank case ventilation (OCV and CCV) applications and others. In such engines, filtration media can operate at high temperature. Further, after engine shutdown the filtration media are heat soaked in high temperature engine fluids (air, lubricants or fuel). Such engines must be equipped with filters and filtration media that can withstand substantially higher heat soak temperatures.

A substantial need exists for filtration media that can withstand high temperatures without suffering a negative performance impact in filtration properties, mechanical integrity, or without suffering loss of filtration components. A substantial need exists to reduce or eliminate glass fiber in media.

Further, making filtration media from glass fiber, however, can result in the media shedding glass fiber from the web structure. Glass fibers leaving the filtration media can enter the downstream flow of fluid from the filter. The flow can direct the glass fiber into the operating mechanism or unit associated with a filter structure. Thus, there is a need in the industry to reduce or eliminate glass fiber in filtration media.

BRIEF DESCRIPTION OF THE INVENTION

We have found a thermally bonded filter medium with improved properties. A first aspect of the medium can provide filtration properties at temperatures, for example, greater than 100° C., greater than 130° C. and often up to and greater than 150° C. in a heat soak mode or in the operating engine or in a fluid passing through the filter medium. The filter structure comprises a first bi-component fiber, an optional second bi-component fiber, and a staple thermoplastic fiber or cellulosic fiber that, in combination, can have improved filtration temperature properties and improved manufacturing character. Further, such improved high temperature media can permit the use of elements in higher temperature conditions and can result in smaller more efficient filtration units, permitting more flexibility in engine design and extended filter lifetime.

A second aspect of the medium is a substantially free of glass fiber that is capable of high efficiency, mechanical stability, long life, substantial versatility and clean-ability (or regenerability) under a variety of extreme conditions, including high temperature.

We have also found a method of making the thermally bonded filter medium, in the absence of a substantial amount of glass fiber that results in rapid removal of process water in the rapid and efficient formation of a wet dewatered web, rapid drying and efficient thermal bonding of the formed web into the final dried filter media. The process involves combining a first bi-component fiber source, an optional second bi-component fiber source, and an effective web forming amount of a staple fiber to form an aqueous furnish, forming a wet web from the aqueous furnish on an inclined screen paper making machine, removing process water from the wet web, drying the wet web and thermally processing the formed web into a finished media. We have found that the combination of these fibers rapidly and efficiently forms a highly useful filtration medium.

The media of the invention can be used in a variety of applications for the purpose of removing solid or liquid particulates from a variety of fluid materials including gases and liquids. Further, the filter media of the invention can be used in a variety of filter element types including flat media, pleated media, flat panel filters, cylindrical spin-on filters, z media pleated filters and other embodiments wherein the fiber and additive components provide useful properties.

The media of the invention comprises an effective amount of a bi-component fiber. The term "bi-component fiber" means a fiber having at least one thermoplastic binder polymer portion with a melting point and a second thermoplastic structural polymer portion with a different and higher melting point than the binder polymer portion. The physical configuration of these fibers is typically in a "side-by-side" or "sheath-core" structure. In side-by-side structure, the two thermoplastic polymer resins are typically extruded in a connected form in a side-by-side structure. The lower melting polymer acts as a binder and the higher melting polymer acts as a structural material. One could also use lobed fibers where the lobes, or tips, are formed from the lower melting point polymer. In the sheath-core structure, the core contains the higher, structural fiber melting point and the sheath contains the lower, bonding layer melting point.

The term "in the substantial absence of glass fiber" or "substantially free of glass fiber" is intended to mean that the filtration medium does not contain a significant amount of glass fiber that contributes to filter properties to any substantial extent. Filtration properties of the media are derived from the bi-component fibers, the staple fibers and other secondary fibers used in the manufacture of the filter media. Of course, insignificant amounts of glass fibers can be introduced into the web without forming a media that relies on glass fibers for any substantial increment of filtration properties An "element" is a filter portion including the web or medium of the invention. A filter generally includes an element in a structure that can be made in a manufacturing operation.

As used herein, the term "fiber" or "fiber source" indicates a large number of compositionally related fibers such that all the fibers fall within a range of fiber sizes or fiber characteristics distributed about a mean or median fiber size or characteristic. Such fibers are characterized by an average diameter and aspect ratio and are made available as a distinct raw material. Blends of one or more of such sources do not read on single sources.

"Glass fiber" means fiber of various diameters and lengths made using glass of various types.

The media of the invention can include a "staple fiber". Staple fibers are single component and non-glass fibers, other than bicomponent fiber, common in media having suitable diameter, length and aspect ratio for use in filtration applications. Staple fibers provide pore size control and cooperate with the other fibers in the media to result in a media of substantial flow rate, high capacity, substantial efficiency, and high wet strength. The careful selection of staple fiber can also improve manufacturing of the materials of the invention. Examples of useful staple fibers in the filter media of the invention are cellulosic and polyester fibers. Cellulosic fibers include cotton fibers, such as cotton linter fibers. Other useful staple fibers include synthetic polymeric fibers such as nylon fibers, polyurethane fibers, and the like.

As used herein, the term "secondary fibers" can include a variety of different fibers from natural, synthetic, or specialty sources. Such fibers can be thermoplastic and are used to obtain a thermally bonded media sheet, media, or filter, and can also aid in obtaining appropriate pore size, permeability, efficiency, tensile strength, compressibility, and other desirable filter properties. The medium of the invention is engineered to obtain the appropriate solidity, thickness, basis weight, fiber diameter, pore size, efficiency, permeability, tensile strength, and compressibility to obtain efficient filtration properties when used to filter a fluid stream.

As used herein, the term "solidity" means a solid fiber volume divided by the total volume of the filter medium, usually expressed as a percentage. The solidity of media used in filtering a dust from an air stream can be different from the solidity of media used for filtering aqueous or oily aerosol from an air stream. Further, the solidity of media used to remove particulates from a liquid stream can be different than the solidity of media used to remove particulates from a gaseous stream. Each application of the technology of the invention is directed to a certain set of operating parameters as discussed below.

As used herein, the term "web" relates to a sheet-like or planar structure having a thickness of greater than about 0.05 mm. This thickness dimension can be at least 0.05 mm, at least 0.08 mm, and at least 0.1 mm, for example. This thickness dimension may be no more than 2 cm, no more than 1 cm, or no more than 5 mm for example. The length and width of the web is not limited and can be an indeterminate or arbitrary choice. Such a web is flexible, machineable, pleatable filter media that is otherwise capable of forming into a filter element or filter structure. The web can have a gradient region and can also have a constant region As used herein, the plural term "filter media" or singular term "filter medium" relate to a web having at least minimal permeability and porosity to be useful in a filter element and is not a substantially impermeable layer such as conventional paper, coated stock or newsprint made in a conventional paper making wet laid processes.

As used herein, the term "fiber morphology" means the shape, form or structure of a fiber. Examples of particular fiber morphologies include twist, crimp, round, ribbon-like, straight, or coiled. For example, a fiber with a circular cross-section has a different morphology than a fiber with a ribbon-like shape.

As used herein, the term "fiber size" is a subset of morphology and includes "aspect ratio," i.e., the ratio of length to diameter. "Diameter" refers either to the average diameter of a substantially circular cross-section of a fiber, or to a largest cross-sectional dimension of a non-circular fiber.

As used herein, the term "fiber composition" means the chemical nature of the fiber and the fiber material or materials, including the arrangement of fiber materials. The fiber composition can be organic or inorganic. Organic fibers are typically natural or synthetic and polymeric or bio-polymeric in nature. Examples of fiber compositions include glass, cellulose, hemp, abacus, a polyolefin, a polyester, a polyamide, a halogenated polymer, a polyurethane, or a combination, blend, or alloy thereof. Inorganic fibers are made of glass, metals and other non-organic carbon source materials.

As used here, the term "surface loading", "surface media" or "surface loading media" refer to media that substantially accumulates its particle loading on the surface and not within the media thickness or depth.

As used herein, the term "depth media", "depth loading layer", or "depth loading media" refers to a filter media in which a filtered particulate is acquired and maintained throughout the thickness or z-dimension of the depth media. In general, a depth media arrangement can be designed to provide loading of particulate materials substantially through its volume or depth. Thus, such arrangements can be designed to load with a higher amount of particulate material, relative to surface-loaded systems, when full filter lifetime is reached. While some of the particulate may in fact accumulate on the surface of the depth media, a depth media has the ability to accumulate and retain the particulate within the thickness of the depth media. In many applications, especially those involving relatively high flow rates, depth media can be used. Depth media is generally defined in terms of its porosity, density or percent solids content. For example, a 2-3% solidity media would be a depth media mat of fibers arranged such that approximately 2-3% of the overall volume comprises fibrous materials (solids), the remainder being air or fluid space. Another useful parameter for defining depth media is fiber diameter. If percent solidity is held constant, but fiber diameter (size) is reduced, pore size is reduced; i.e. the filter becomes more efficient and will more effectively trap small particles. A typical conventional depth media filter is a relatively constant (or uniform) density media, i.e. a system in which the solidity of the depth media remains substantially constant throughout its thickness. However, in some depth media, one or more gradients can exist. For example, the concentration of a fiber can change from a first upstream surface to a second downstream surface; that is, through the thickness of the medium.

As used herein, the term "substantially constant" means that only relatively minor fluctuations (no more than about 5%), if any, in an indicated property such as concentration or density, are found throughout the depth of the media. Such fluctuations, for example, may result from a slight compression of an outer engaged surface, by a container in which the filter media is positioned. Such fluctuations, for example, may also result from the small but inherent enrichment or depletion of fiber in the web caused by variations in the manufacturing process. A medium can have a region that is a substantially constant region of concentration of a fiber.

As used herein, the terms "loading media", "loading layer", "efficiency media" or "efficiency layer" refers to filter elements having a combination of at least two different media or media layers, where one media has a smaller average pore size and is referred to as an efficiency layer and the media having the larger average pore size is referred to as the loading layer, loading media, or depth loading media. The loading layer is typically followed in a fluid pathway by the efficiency layer. The efficiency layer has suitable porosity, efficiency, permeability and other filtration characteristics to remove any remaining particulate from the fluid stream as the fluid exits the loading layer For the purpose of this disclosure, the term "pore size" refers to spaces formed by fibrous materials within the media. The pore size of the media can be estimated by reviewing electron photographs of the media. The average pore size of a media can also be calculated using a Capillary Flow Porometer having model no. APP 1200 AEXSC available from Porous Materials Inc. of Ithaca, N.Y.

For the purpose of this disclosure, the term "bonded fiber" indicates that in the formation of the media or web of the invention, fibrous materials form a physical or chemical bond to adjacent fibrous materials. Such a bond can be formed utilizing the inherent properties of the fiber, such as by melt fusing the lower melting component of a bi-component fiber. Alternatively, the fibrous materials of the web or media of the invention can be bonded using separate resinous binders that are provided in some cases in the form of an aqueous dispersion of a binder resin. Alternatively, the fibers of the invention can also be cross linked using crosslinking reagents, bonded using an electron beam or other energetic radiation that can cause fiber to bond, through high temperature bonding, or through any other bonding process that can cause one fiber to bond to another.

As used herein, the term "source" is a point of origin, such as a point of origin of a fluid flow stream comprising a fiber. One example of a source is a nozzle. Another example is a headbox.

As used herein, the term "furnish" means a relative dilute blend of fibers and liquid (less than 10 wt. % solids; often less than 5 wt. % solids and often less than 1 wt. % solids). In some embodiments, the liquid includes water. In some embodiments, the furnish liquid is water and is an "aqueous furnish".

As used herein the term "wet layer" means a layer made from a furnish by removing water or aqueous media from the furnish, leaving the wet fiber in the form of a "wet layer." This wet layer is dried to form the medium.

"Machine direction" is the direction parallel to the direction that a web travels through an apparatus, such as an apparatus that is producing the web. In some embodiments, the machine direction is the direction of the longest dimension of the web.

The media of the invention can be used in a variety of applications for the purpose of removing solid or liquid particulates from a variety of fluid materials including gases or liquids. Further, the filtered medium of the invention used in a variety of filter element types including flat media, wraps, pleated media, flat panel filters, cylindrical spin-on filters, z media pleated filters and other embodiments wherein the fiber and additive components provides useful properties even in the absence of glass fiber component.

We have found that the careful selection of one or more staple fibers made of polyester, cotton and other sources can result in a substantially improved filter media properties or improved manufacturing processing and yield. The media can also comprise a fluorochemical treatment. We have found that these fluorochemical media have substantially improved durability, and can experience improved pressure drop during operation at similar or improved efficiencies and when used in crank case ventilations can have reduced mass increase due to oil retention and substantially improved oil drainage.

DETAILED DESCRIPTION

The media include nonwoven webs comprising a thermally bonded web comprising a first bicomponent fiber and an optional second bicomponent fiber or staple fiber that can function at elevated temperatures. The media of the invention comprises a thermally bonded web comprising a bi-component fiber with high temperature sheath melting properties that can be combined with staple media fibers or secondary fibers, and can be substantially free of glass fiber. In one embodiment, the bi-component fiber(s) are combined with a staple polyester fiber. In another embodiment, the bi-component fiber(s) are combined with a staple cellulosic fiber, preferably a cotton linter fiber. In a third embodiment, a method of forming the thermally bonded web comprises combining a bi-component fiber in an aqueous furnish with other staple fibers and forming the web using conventional inclined screen paper making machines. A final embodiment comprises a method of filtering a mobile fluid.

The filter materials described herein (filter medium or media) can be used in a variety of filter applications, including but not limited to pulse cleaned and non-pulse cleaned filters for dust collection, OCV and CCV applications, in gas turbines and engine air intake or induction systems, gas turbine intake or induction systems, heavy duty engine intake or induction systems, light vehicle engine intake or induction systems, vehicle cabin air, off road vehicle cabin air, disk drive air, photocopier-toner removal, and HVAC filters in both commercial or residential filtration applications. In general, such filter elements comprise a dense web or mat of bi-component fiber with cellulose, synthetic or other fibers oriented across a gas stream carrying particulate material. The web or element is generally constructed to be permeable to the gas flow, and to also have a sufficiently fine pore size and appropriate porosity to inhibit the passage of particles greater than a selected size there-through. As the gases (fluids) pass through the web or element, the upstream side of the web operates through diffusion and interception to capture and retain selected sized liquid or solid particles from the gas or liquid (fluid) stream. The particles can be collected as a cake on the upstream side of the "surface loading" web or can be collected through the "depth loading" aspect of the filter media.

In general, the filter materials described herein can be used to filter air and gas streams that often carry particulate material entrained therein. In many instances, removal of some or all of the particulate material from the stream is necessary for continued operations, comfort or aesthetics. For example, air intake streams to the cabins of motorized vehicles, to engines for motorized vehicles, or to power generation equipment; gas streams directed to gas turbines; and, air streams to various combustion furnaces, often include particulate material. In the case of cabin air filters, it is desirable to remove the particulate matter for comfort of the passengers and/or for aesthetics. With respect to air and gas intake streams to engines, gas turbines and combustion furnaces, it is desirable to remove the particulate material because it can cause substantial damage to the equipment involved.

In other instances, production gases or off gases from industrial processes or engines may contain particulate material. Before such gases can be, or should be, discharged through various locations in downstream equipment or to the atmosphere, it may be desirable to obtain a substantial removal of particulate material from those streams.

In general, the filter materials described herein can be applied to filter liquid systems. In liquid filtering techniques, the collection mechanism is believed to be sieving when particles are removed through size exclusion. In a single layer the efficiency is that of the layer. The composite efficiency in a liquid application is limited by the efficiency of the single layer with the highest efficiency. The liquids could be directed through the media according to the invention, with particulates therein trapped in a sieving mechanism. In liquid filter systems, i.e. wherein the particulate material to be filtered is carried in a liquid, such applications include aqueous, non-aqueous, and mixed aqueous/non-aqueous applications such as water streams, lube oil, hydraulic fluid, fuel filter systems or mist collectors, for example. Aqueous streams include natural and man-made streams such as effluents, cooling water, process water, etc. Non-aqueous streams include gasoline, diesel fuel, petroleum and synthetic lubricants, hydraulic fluid and other ester based working fluids, cutting oils, food grade oil, etc. Mixed streams include dispersions comprising water in oil and oil in water compositions and aerosols comprising water and a non-aqueous component.

Fluid (liquid and gaseous) streams carry substantial amounts of particulates as solids, as aerosol liquids, or both. The majority of the liquid droplets within the aerosol is generally less than 100 microns but can be within the size of 0.01 to 50 microns, or 0.1-5 microns. In addition, such streams also carry substantial amounts of fine particulate contaminant, such as carbon contaminants. Such contaminants generally can be a large as 100 microns and can have an average particle size of about 0.5-3 microns. The filter materials described herein are adapted for the purpose of removing particulates from fluid streams having a particle size of about 0.01 to 100 micrometers, from gas streams containing liquids in the form of a mist having droplet size of about 0.01 to 100 micrometers, from aqueous streams having a particle size of about 0.1 to 100 micrometers from non-aqueous streams having a particle size of about 0.05 to 100 micrometers or from fuel, lubricant or hydraulic streams having a particle size of about 0.05 to 100 micrometers.

A variety of efforts have been directed to reducing the amount of contaminants in many filtered systems. The variables that affect removal include the following: (a) size/efficiency concerns; that is, a desire for good efficiency of separation while at the same time avoidance of a requirement for a large separator system; (b) cost/efficiency; that is, a desire for good or high efficiency without the requirement of substantially expensive systems; (c) versatility; that is, development of systems that can be adapted for a wide variety of applications and uses, without significant re-engineering; and, (d) cleanability/regeneratability; that is, development of systems which can be readily cleaned (or regenerated) if such becomes desired, after prolonged use.

An additional aspect of the invention comprises a preferred method of filtering with crankcase ventilation (OCV and CCV) filters. Filter media in arrangements to filter engine gasses including crankcase gases can also be used. The preferred media is made in sheet form from a wet laid process and is incorporated into filter arrangements, in a variety of ways, for example by a wrapping or coiling approach or by providing in a panel construction.ilter constructions for preferred uses to filter blow-by gases from engine crankcases are provided. Also provided are preferred filter element or cartridge arrangements including the preferred type of media.

We have found that by blending various proportions of bi-component and staple or media fiber(s) that substantially improved strength and filtration at elevated temperatures can be obtained. Further, avoiding the use of substantial amounts of glass fiber and blending various fiber diameters can also result in enhanced properties.

Wet laid or dry laid processes can be used. In one embodiment to make the filter media, a fiber mat is formed using either wet or dry processing. The mat is heated to melt thermoplastic materials to form the media by internally adhering the fibers. The bi-component fiber used in the media permits the fiber to fuse into a mechanically stable sheet, media, or filter. The bi-component fiber having a thermally bonding exterior sheath (or other bi-component form) causes the bi-component fiber to bind with other fibers in the media layer. In less preferred embodiments, the bi-component fiber can be used with an aqueous or solvent based resin and other binders to form the medium.

In the preferred method of wet laid processing, the medium is made from a dilute (0.05 to 5 wt. % solids in the furnish) aqueous furnish comprising a dispersion of fibrous material in an aqueous medium. The aqueous liquid of the dispersion is generally water, but may include various other materials such as pH adjusting materials, surfactants, defoamers, flame retardants, viscosity modifiers, media treatments, colorants and the like. The aqueous liquid is usually drained from the dispersion by conducting the dispersion onto an inclined screen or other perforated support retaining the dispersed solids and passing the liquid to yield a wet paper composition. The wet composition, once formed on the support, is usually further dewatered by vacuum or other pressure forces and further dried by evaporating the remaining liquid. After liquid is removed, thermal bonding takes place typically by melting some portion of the thermoplastic fiber, resin or other portion of the formed material. The melt material binds the component into a layer.

The media described herein can be made on equipment of any scale from laboratory hand-screen or hand sheet proportions to commercial-sized papermaking. For a commercial scale process, the bi-component mats are generally processed through the use of inclined screen papermaking-type machines such as commercially available Fourdrinier, wire cylinder, Stevens Former, Roto Former, Inver Former, Venti Former, and inclined Delta Former machines. Preferably, an inclined Delta Former machine is utilized. The general process involves making a dispersion of bi-component fibers, staple or media fibers, or other medium material in an aqueous liquid, draining the liquid from the resulting dispersion to yield a wet composition, and adding heat to form, bond and dry the wet non-woven composition to form the medium. After formation, the wet or dry web can be treated with additive materials to provide added properties.

Preferably, the filtration media of the invention is typically wet laid and is made up of randomly oriented array of a combination of bi-component fiber(s) and staple fiber, such as a polyester or cellulosic fiber. These fibers are bonded together using the fusible polymer in the bi-component fiber and in some embodiments, with the addition of a binder or resin. The preferred web is free of resin binder.

In one embodiment, the media that can be used in the filters and methods described herein comprise a staple fiber, a bi-component binder fiber, a binder and other components. The staple fiber can include organic fibers such as natural and synthetic fibers including polyolefin, polyester, nylon, cotton, cotton fleece or linters, wool, etc. fibers. The media fiber of the invention can also include a minor amount (often less than 5 wt. %) of inorganic fiber such as metal, silica, boron, carbon, and other related fibers.

The filter media of the present invention is typically suited for high efficiency filtration properties such that fluids, including air and other gasses, aqueous and non-aqueous fuel, lubricant, hydraulic or other such fluids can be rapidly filtered to remove contaminating particulates.

Piston engines including pressure-charged diesel engines often generate "blow-by" gases, i.e., a flow of air-fuel mixture leaking past pistons from the combustion chambers. Such "blow-by gases" generally comprise a gas phase, for example, air or combustion off gases, carrying:(a) hydrophobic fluid (e.g., oil, including fuel aerosol) principally comprising 0.05-10.0 micron droplets (principally, by number); and (b) carbon contaminant from combustion, typically comprising carbon particles, a majority of which are conventionally about 0.1-1.0 microns in size. Such "blow-by gases" are generally directed outwardly from the engine block, through a blow-by vent.

When the term "hydrophobic fluids" is used in reference to the entrained liquid aerosol in gas flow, reference is meant to non-aqueous fluids, especially oils. Generally, such materials are immiscible in water. Herein the term "gas" or variants thereof, used in connection with the carrier fluid, refers to air, combustion off gases, and other carrier gases for the aerosol.

Engines operating in such systems as trucks, farm machinery, boats, buses, and other systems generally comprising piston (gasoline and diesel) engines, High pressure diesel engines experience significant air or CCV or OCV gas flows contaminated as described above. For example, flow rates can be about 2-50 feet per minute (fpm) or 0.6-15 m-min$^{-1}$, typically 5 to 10 fpm or 1.6-3.2 m-min$^{-1}$. In a turbocharged diesel engine, air is taken to the engine through an air filter, cleaning the air taken in from the atmosphere. A turbo pushes clean air through a filter into engine. The air undergoes compression and combustion by inclusion within the combustion chamber and engaging with pistons and fuel. During the combustion process, the engine gives off blow-by gases. A filter arrangement is in gas flow communication with the engine and cleans the blow-by gases that are returned to the air intake, fuel or other induction system component. The gasses and air is again pulled through by the turbo and into the engine. The filter arrangement in gas flow communication that is used for separating a hydrophobic liquid phase from a gaseous stream (sometimes referred to herein as a coalescer/separator arrangement) is provided using the filter media described herein. In operation, a contaminated gas flow is directed into the coalescer/separator arrangement. Within the arrangement, the fine oil phase or aerosol phase (i.e., hydrophobic phase) coalesces. The arrangement is constructed so that as the hydrophobic phase coalesces into droplets, it will drain as a liquid such that it can readily be collected and removed from the system. With preferred arrangements as described herein below, the coalescer or coalescer/separator, especially with the oil phase in part loaded thereon, operates as a filter for other contaminant (such as carbon contaminant) carried in the gas stream. Indeed, in some systems, as the oil is drained from the system, it will provide some self-cleaning of the coalescer because the oil will carry therein a portion of the trapped carbon contaminant.

The principles according to the present disclosure can be implemented in single stage arrangements or multistage arrangements. We have found, in one embodiment, that two or more layers of filter media of this description can be combined in one element. Two or more similar or identical media can be combined in a filter structure for additive improvement in filtration. Alternatively, two substantially dissimilar media can be used to combine different types and amounts of filtration. The media can be dissimilar in any operational characteristic, including pore size, permeability, efficiency, thickness, materials composition, etc. In one embodiment, a loading layer (with larger pore sizes than the efficiency layer) and an efficiency layer can be used, each of said layers having distinct structures and filtration properties, to form a composite layer. The loading layer is followed in a fluid pathway by an efficiency layer. The efficiency layer is a highly efficient (in comparison to the loading layer) layer having suitable porosity, efficiency, permeability and other filtration characteristics to remove any remaining harmful particulate from the fluid stream as the fluid passes through the filter structure. The loading filtration media of the invention has a basis weight of about 30 to about 100 g-m$^{-2}$. The efficiency layer has a basis weight of about 40 to about 150 g-m$^{-2}$. The loading layer has an average pore size of about 5 to about 30 micrometers. The efficiency layer has a pore size smaller than the loading layer that ranges from about 0.5 to about 3 micrometers. The loading layer has a permeability that ranges from about 50 to 200 ft-min$^{-1}$ or 15.2-61 m-min$^{-1}$. The efficiency layer has a permeability of about 5 to 30 ft-min$^{-1}$ or 1.52-9.14 m-min$^{-1}$. The loading layer or the efficiency layer of the invention has a wet bursting strength of greater than about 5 lb-in$^{-2}$, typically about 10 to about 25 lb-in$^{-2}$ (greater than 34.4 kPa or 69-172 kPa). The combined filtration layer has a permeability of about 4 to 20 ft-min$^{-1}$; a wet burst strength of 10 to 20 lb-in$^{-2}$ (69-138 kPa) and a basis weight of 100 to 200 g-m$^{-2}$ Briefly, the fibers can be of a variety of compositions, diameters and aspect ratios. The concepts described herein for forming a useful media in a nonwoven web are independent of the particular fiber stock used to create the web. For the compositional identity of the fiber, the skilled artisan may find any number of fibers useful. Such fibers are normally processed from either organic or inorganic products. The requirements of the specific application for the media may make a choice of fibers, or combination of fibers, more suitable. The fibers of the media may comprise bi-component, cellulose, hemp, abacus, a polyolefin, polyester, a polyamide, a halogenated polymer, polyurethane, acrylic or a combination thereof. Binder resins can be used to help bond the fibers into a mechanically stable medium or web, typically in the absence of bi-component fiber. Such binder resin materials can be used as a dry powder or solvent system, but are typically aqueous dispersions (latex or one of a number of lattices) of vinyl thermoplastic resins. Additives of sizing, fillers, colors, retention aids, recycled fibers from alternative sources, binders, adhesives, cross-linkers, particles, or antimicrobial agents may be added to the aqueous dispersion.

In somewhat greater detail, bi-component fibers are typically fibers made of two polymer components. The polymer components comprise a lower melting thermoplastic binder polymer and a higher melting structural polymer. Such bi-component fibers can be "core/shell" fibers or "side-by-side" fibers or "multi-lobe" fibers. The bi-component fibers operate by providing, for example, the sheet fiber having a melting point such that during the thermal forming process the fiber is heated to a temperature such that the lower melting polymer can fuse and bond the fibers into an intact web. Typically, the higher melting polymer is the material that provides structural integrity to the web and does not melt at either thermal bonding temperatures or at use temperatures. In the webs or media described herein, the webs comprise a bi-component fiber and an optional second bi-component fiber. The bi-component fiber preferably has a sheath-core structure. The preferred bi-component fiber of the invention has a higher melting characteristici.e., the lower melting pointpolymer of the bi-component fiber has a melting point of at least 100° C., 120° C., and more preferably at least about 140° C., and most preferably of about 140 to 160° C.; while the higher melting point polymer of the bi-component fiber has a melting point of at least 235° C. or about 240 to 260° C. The optional bi-component fiber has a lower melting characteristic, with the lower melting point of the binder polymer of the bi-component fiber less than that of the high temperature fiber and can range from about 70 to 115° C. and the higher melting point polymer of the bi-component fiber has a melting point greater than 200° C. and of about 240 to 260° C. Further, the bi-component fibers can be integrally mixed and evenly dispersed with the staple, pulp, or cotton fibers.

In preferred embodiments, the bi-component fibers typically have a fiber diameter of about 5 to 50 micrometers, often about 10 to 20 micrometers, and typically in a fiber form generally have a length of 0.1 to 20 millimeters or often have a length of about 0.2 to about 15 millimeters. Such fibers can be made from a variety of thermoplastic materials including polyolefins (such as polyethylenes, polypropylenes); polyesters (such as polyethylene terephthalate, PET, poly-butylene terephthalate, PBT); nylons including nylon 6, nylon 66, nylon 612, etc. Any thermoplastic that can have an appropriate melting point can be used in the bi-component fiber while higher melting polymers can be used in the higher melting portion of the fiber. The bicomponent fiber can have (e.g.) a PET/PET or nylon 6/nylon 6,6 structure with PET/components of different melting points or nylon. The cross-sectional structure of such fibers can be, as discussed above, the "side-by-side" or "sheath-core" structure or other structures that provide the same thermal bonding function. One could also use lobed fibers where the tips have lower melting point polymer. The he relatively low molecular weight polymer of the bi-component fiber can melt under sheet, media, or filter forming conditions to act to bind the bi-component fiber, and other fibers present in the sheet, media, or filter making material into a mechanically stable sheet, media, or filter.

The bi-component (e.g., core/shell or sheath and side-by-side) fibers can be made up similar or of different thermoplastic materials, such as for example, polyolefin/polyester (sheath/core) bi-component fibers whereby the polyolefin, e.g. polyethylene sheath, melts at a temperature lower than the core, e.g. polyester or polyester/polyester or nylon/nylon materials. Typical thermoplastic polymers include polyolefins, e.g. polyethylene, polypropylene, polybutylene, and copolymers thereof; polytetrafluoroethylene; polyesters, e.g. polyethylene terephthalate; vinyl acetates, e.g, polyvinyl acetate, polyvinyl chloride acetate; polyvinyl butyral; acrylic resins, e.g. polyacrylate, and poly methyl acrylate, poly methyl methacrylate; polyamides, namely nylon; polyvinyl chloride, polyvinylidene chloride; polystyrene; polyvinyl alcohol; polyurethanes; cellulosic resins, namely cellulosic nitrate, cellulosic acetate, cellulosic acetate butyrate, ethyl cellulose, etc.; copolymers of any of the above materials, e.g. ethylene-vinyl acetate copolymers, ethylene-acrylic acid copolymers, styrene-butadiene block copolymers, Kraton rubbers and the like.

Particularly preferred in the fiber media described hereinis a bi-component fiber known as 271P available from DuPont. Others fibers include FIT 201, Kuraray N720 and the Nichimen 4080 and similar materials. These fibers demonstrate the characteristics of bonding the sheath to sheath polymer upon completion of first melt. One preferred fiber is a PET core/PET sheath fiber. Typical CCV operating temperatures range from about 75 to 175° C.

Media fibers are fibers that can aid in filtration or in forming a structural media layer. Such fiber is made from a number of both hydrophilic, hydrophobic, oleophilic, and oleophobic fibers. These fibers cooperate with the binder, secondary fiber and the bi-component fiber to form a mechanically stable, but strong, permeable filtration media that can withstand the mechanical stress of the passage of fluid materials and can maintain the loading of particulate during use. Such fibers are typically monocomponent fibers with a diameter that can range from about 0.1 to about 50 micrometers and can be made from a variety of materials including naturally occurring cotton, linen, wool, various cellulosic and proteinaceous natural fibers, synthetic fibers including rayon, acrylic, aramide, nylon, polyolefin, polyester fibers. One type of secondary fiber is a binder fiber that cooperates with other components to bind the materials into a sheet. Another type of structural fiber cooperates with other components to increase the tensile and burst strength of the materials in dry and wet conditions. Additionally, the binder fiber can include fibers made from such polymers as polyvinyl chloride, and polyvinyl alcohol. Secondary fibers can also include inorganic fibers such as carbon/graphite fiber, metal fiber, ceramic fiber and combinations thereof. Depending on the application, the media or medium can comprise a wide variety of amount of secondary binder fiber. Amounts used in different media examples can be 0.1 to 10 wt %.

Cotton is a soft, fluffy staple fiber that grows in a boll around the seeds of the cotton plant. Cotton is essentially 95% cellulose combined with other non-cellulosic components including natural waxes, proteins and other biological materials. The cotton fiber of typical cultivated cotton materials are divided into two groups. Cotton fibers can be considered as "fuzz" or "linter or linters". The major distinction between fuzz, cotton and linter cotton is length with pigmentation and strength. Cotton fuzz fibers are similar to linter fibers, except they are typically 0.33 cm compared with the 2.5 cm average length of linter fibers. Fuzz fibers tend to be about 30-40 microns in thickness, where as linter fibers tend to be about 30 microns or less. Linter fibers are also distinguished from fuzz fiber since linter fibers tend to be produced close to the seed and are typically removed last in the fiber manufacture process. Both cotton "fuzz" fiber and cotton "linter" fiber are standard commercial products of cotton manufacturer and can be obtained from a variety of sources including Buckeye and Southern Cellulose. Cotton linters are fine, silky fibers which adhere to the seeds of the cotton plant after ginning. These curly fibers typically are less than 3 mm long. The term also may apply to the longer textile fiber staple lint as well as the shorter fuzzy fibers from some upland species. Linters are traditionally used in the manufacture of paper and as a raw material in the manufacture of cellulose. Linters are often referred to as "cotton wool". This can also be a refined product (absorbent cotton in U.S. usage) which has medical, cosmetic and many other practical uses. Preferred cotton linters have the following characteristics: Length less than 5 mm or about 0.5 to 4 mm, diameter less than 80 microns or about 15 to 55 microns.

One important aspect of the media described herein that comprise cotton is the property that when combined with a bi-component fiber, the cotton linters substantially improves manufacturing success, speed and productivity of the wet-laid flowing processes and a staple wet layer.

Staple thermoplastic fibers include, but are not limited to, polyester fibers, polyamide fibers, polypropylene fibers, co-polyether ester fibers, polyethylene terephthalate fibers, polybutylene terephthalate fibers, poly ether ketone ketone (PEKK) fibers, poly ether ether ketone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46) including cellulosic fibers, polyvinyl acetate, polyvinyl alcohol fibers (including various hydrolysis of polyvinyl alcohol such as 88% hydrolyzed, 95% hydrolyzed, 98% hydrolyzed and 99.5% hydrolyzed polymers), cotton, viscose rayon, thermoplastic such as polyester, polypropylene, polyethylene, etc., polyvinyl acetate, polylactic acid, and other common fiber types. The thermoplastic fibers are generally fine (about 0.5-20 denier diameter), short (about 0.1-5 cm long), staple fibers, possibly containing precompounded conventional additives, such as antioxidant, stabilizers, lubricants, tougheners, etc. In addition, the thermoplastic fibers may be surface treated with a dispersing aid. The preferred thermoplastic fibers are polyamide and polyethylene terephthalate fibers, with the most preferred being polyethylene terephthalate fibers.

Binder resins can be used to help bond the fiber into a mechanically stable media layer. Such thermoplastic binder resin materials can be used as a dry powder or solvent system, but are typically aqueous dispersions (a latex or one of a number of lattices) of vinyl thermoplastic resins. A resinous binder component is not necessary to obtain adequate strength for the media, but can be used. Resin used as binder can be in the form of water soluble or dispersible polymer added directly to the media web making dispersion or in the form of thermoplastic binder fibers of the resin material intermingled with the aramid and staple or media fibers to be activated as a binder by heat applied after the media web is formed. Resins include vinyl acetate materials, vinyl chloride resins, polyvinyl alcohol resins, polyvinyl acetate resins, polyvinyl acetyl resins, acrylic resins, methacrylic resins, polyamide resins, polyethylene vinyl acetate copolymer resins, thermosetting resins such as urea phenol, urea formaldehyde, melamine, epoxy, polyurethane, curable unsaturated polyester resins, polyaromatic resins, resorcinol resins and similar elastomer resins. The preferred materials for the water soluble or dispersible binder polymer are water soluble or water dispersible thermosetting resins such as acrylic resins, methacrylic resins, polyamide resins, epoxy resins, phenolic resins, polyureas, polyurethanes, melamine formaldehyde resins, polyesters and alkyd resins, generally, and specifically, water soluble acrylic resins, methacrylic resins, polyamide resins, that are in common use in the papermaking industry. Such binder resins typically coat the fiber and adhere fiber to fiber in the final non-woven matrix. Sufficient resin is added to thefurnish to fully coat the fiber without causing film over of the pores formed in the sheet, media, or filter material. The resin can be added to the furnish during papermaking or can be applied to the media after formation.

A latex binder can be used to improve modulus or stiffness, but is not preferred, since its use in a furnish can reduce permeability. The latex binder, if used to bind together the three-dimensional non-woven fiber web in each non-woven layer or used as the additional adhesive, can be selected from various latex adhesives known in the art. The skilled artisan can select the particular latex adhesive depending upon the type of cellulosic fibers that are to be bound. The latex adhesive may be applied by known techniques such as spraying or foaming. Generally, latex adhesives having from 15 to 25% solids are selected when a latex binder is used. The dispersion can be made by dispersing the fibers and then adding the binder material or dispersing the binder material and then adding the fibers. The dispersion can, also, be made by combining a dispersion of fibers with a dispersion of the binder material. Non-woven media described herein can contain secondary fibers made from a number of both hydrophilic, hydrophobic, oleophilic, and oleophobic fibers. These fibers cooperate with the staple or media fiber and the bi-component fiber to form a mechanically stable, but strong, permeable filtration media that can withstand the mechanical stress of the passage of fluid materials and can maintain the loading of particulate during use. Secondary fibers are typically monocomponent fibers with a diameter that can range from about 0.1 to about 50 micrometers and can be made from a variety of materials including naturally occurring cotton, linen, wool, various cellulosic and proteinaceous natural fibers, and synthetic fibers including rayon, acrylic, aramide, nylon, polyolefin, and polyester fibers. One type of secondary fiber is a binder fiber that cooperates with other components to bind the materials into a sheet. Another type of secondary fiber is a structural fiber that cooperates with other components to increase the tensile and burst strength the materials in dry and wet conditions. Additionally, the binder fiber can include fibers made from such polymers as polyvinyl chloride, polyvinyl alcohol. Secondary fibers can also include inorganic fibers such as carbon/graphite fiber, metal fiber, ceramic fiber and combinations thereof.

Fluoro-organic treatments useful in this invention are small or polymeric organic molecules having one or more $C_{2-7}$ fluoroaliphatic radical. The radical is a fluorinated, monovalent, aliphatic organic radical containing at least two carbon atoms. Preferably, it is a saturated perfluoroaliphatic monovalent organic radical. However, hydrogen or chlorine atoms can be present as substituents on the skeletal chain. While radicals containing a large number of carbon atoms may function adequately, compounds containing not more than about 20 carbon atoms are preferred since large radicals usually represent a less efficient utilization of fluorine than is possible with shorter skeletal chains. The treatment composition can comprise a small molecule or a polymeric composition in combination with typical additive mateials. The treatment composition can be used to prepare the furnish or to treat the wet or dried web after formation.

The cationic groups that are usable in the fluoroorganic treatments employed in this invention may include an amine or a quaternary ammonium cationic group which can be oxygen-free (e.g., —NH$_2$) or oxygen-containing (e.g., amine oxides). Such amine and quaternary ammonium cationic hydrophilic groups can have formulas such as —NH$_2$, —(NH$_3$)X, —(NH(R$^2$)$_2$)X, —(NH(R$^2$)$_3$)X, or —N(R$_2$)$_2$ →O, where x is an anionic counterion such as halide, hydroxide, sulfate, bisulfate, or carboxylate, R$^2$ is H or C$_{1-18}$ alkyl group, and each R$^2$ can be the same as or different from other R$^2$ groups. Preferably, R$^2$ is H or a C$_{1-16}$ alkyl group and X is halide, hydroxide, or bisulfate.

The anionic groups which are usable in the fluoroorganic treatments employed in this invention include groups which by ionization can become radicals of anions. The anionic groups may have formulas such as —COOM, —SO$_3$M, —OSO$_3$M, —PO$_3$HM, —OPO$_3$M$_2$, or —OPO$_3$HM, where M is H, a metal ion, (NR$^1_4$)$^+$, or (SR$^1_4$)$^+$, where each R$^1$ is independently H or substituted or unsubstituted C$_1$-C$_6$ alkyl. Preferably M is Na$^+$ or K$^+$. The preferred anionic groups of the fluoro-organo treatments used in this invention have the formula —COOM or —SO$_3$M. Included within the group of anionic fluoro-organic treatments are anionic polymeric materials typically manufactured from ethylenically unsaturated carboxylic mono- and diacid monomers having pendent fluorocarbon groups appended thereto. Such materials include surfactants obtained from 3M Corporation known as FC-430 and FC-431.

Fluororganic treatments can be used in the media. The amphoteric groups which are usable in the fluoro-organic treatment employed in this invention include groups which contain at least one cationic group as defined above and at least one anionic group as defined above.

The nonionic groups which are usable in the fluoroorganic treatments employed in this invention include groups which are hydrophilic but which under pH conditions of normal agronomic use are not ionized. The nonionic groups may have formulas such as —O(CH$_2$CH$_2$) where x is greater than 1, —SO$_2$NH$_2$, —SO$_2$NHCH$_2$CH$_2$OH, —SO$_2$N(CH$_2$CH$_2$H)$_2$, —CONH$_2$, —CONHCH$_2$CH$_2$OH, or —CON(CH$_2$CH$_2$OH)$_2$. Examples of such materials include materials of the following structure:

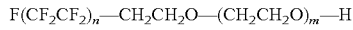

F(CF$_2$CF$_2$)$_n$—CH$_2$CH$_2$O—(CH$_2$CH$_2$O)$_m$—H wherein n is 2 to 8 and m is 0 to 20.

Other fluoroorganic treatments include those cationic fluorochemicals described, for example in U.S. Pat. Nos. 2,764,602; 2,764,603; 3,147,064 and 4,069,158. Such amphoteric fluoroorganic treatments include those amphoteric fluorochemicals described, for example, in U.S. Pat. Nos. 2,764,602; 4,042,522; 4,069,158; 4,069,244; 4,090,967; 4,161,590 and 4,161,602. Such anionic fluoroorganic treatments include those anionic fluorochemicals described, for example, in U.S. Pat. Nos. 2,803,656; 3,255,131; 3,450,755 and 4,090,967.

Fluoroorganic agents useful in this invention for addition to the fiber layers are C$_{2-7}$ fluoroorganic molecules. Preferably, it is a chemical with a saturated perfluoroaliphatic organic group. However, hydrogen or chlorine atoms can be present as substituents on the skeletal chain.

Examples of such materials are duPont Zonyl FSN and duPont Zonyl FSO nonionic surfactants. Another aspect of additives that can be used in the polymers of the invention include low molecular weight fluorocarbon acrylate materials such as 3M's Scotchgard material having the general structure:

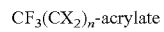

CF$_3$(CX$_2$)$_n$-acrylate wherein X is —F or —CF$_3$ and n is 1 to 7.

The preferred fluoropolymer of the invention is a polymer composition comprising polymer with repeating unit comprising a residue of Formula I:

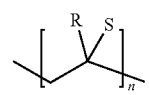

wherein S is:

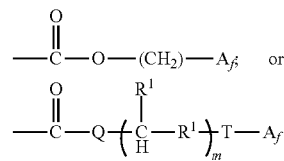

wherein Q is a spacer such as —(CH$_2$)$_x$—, —Y—, —Y(CH$_2$)$_x$—, —(CH$_2$)$_x$Y—, or —(CH$_2$)$_x$Y(CH$_2$)$_x$—, where Y is aryl (preferably phenyl);

R is H or methyl;

the fluoroalkyl groups A$_f$ of the present invention are preferably C$_{2-6}$ fluoroalkyl, and more preferably C$_{4-6}$ fluoroalkyl. The fluoroalkyl groups are optionally but preferably perfluoroalkyl (that is, all hydrogens replaced by fluorine). The fluoroalkyl groups may contain one or two heteroatoms selected from N and O, examples of which include but are not limited to: -A$_f^1$; —O-A$_f^2$; -A$_f^1$-NA$_f^2$A$_f^3$; -A$_f^1$-O-A$_f^2$(-A$_f^3$)$_m$—NA$_f^4$A$_f^5$, where A$_f^1$, A$_f^2$, A$_f^3$, A$_f^4$, and A$_f^5$ are independently each a perfluoroalkyl; wherein A can be —(CF$_2$)$_x$—CF$_3$, where m is defined above.

Each R$_1$ are independently H or halo (preferable fluoro-);

T is —O— or a covalent bond;

n is a number characteristic of acrylic polymers m is 0 or 1 or 2;

x is 1 to 5 x+x' is 2 to 10; and x+x'+m is not greater than 10;

The polymers may an n characteristic of acrylic polymers and can have any suitable molecular weight, for example, from 1,000 or 2,000 up to 5,000, or in some embodiments 1000 up to 50,000 or 100,000 or more.

Suitable comonomer (generally ethylenically unsaturated compounds) that can be used as for the comonomer containing the hydrophobic group or the comonomer containing the attachment group includes ethylenically unsaturated compounds capable of copolymerizing with a (meth)acrylic acid. Examples include ethylene, vinyl acetate, vinyl chloride, vinylidene halide, (meth)acrylic acid, (meth)acrylonitrile, styrene, alphamethylstyrene, p-methylstyrene, (meth)acrylamide, N-methylol (meth)acrylamide, hydroxymethyl (meth)acrylate, hydroxyethyl (meth)acrylate, hydroxypropyl (meth)acrylate, 3-chloro-2-hydroxypropyl (meth)acrylate, polyethylene glycol (meth)acrylate, polypropylene glycol (meth)acrylate, methoxypolyethylene glycol (meth)acrylate, methoxypolypropylene glycol (meth)acrylate, N,N-dimethylaminoethyl (meth)acrylate, N,N-diethylaminoethyl (meth)acrylate, glycidyl (meth)acrylate, tetrahydrofurfuryl (meth)acrylate, benzyl (meth)acrylate, phenoxyethyl (meth)acrylate, dicyclopentenyl (meth)acrylate, hydroxypropyltrimethylammonium chloride methacrylate, ethyltrimethylammonium chloride methacrylate, vinyl alkyl ether, alkyl vinyl ether halide, butadiene, isoprene, chloroprene, maleic anhydride. (meth)acrylates, (with not fluorogroups, represented by the general formula (Formula 4):

$$CH_2=CA^1CO_2\text{-alkyl} \qquad \text{(Formula 4)}$$

[wherein $A^1$ represents a hydrogen atom or a methyl group, and alkyl represents an alkyl group represented by $C_mH_{2m}+1$ (m represents an integer of 1 to 30)]; Fluorosulfonate compounds (sulfonic acid-containing monomers)

One embodiment of the invention combines a fluorochemical compound with a urethane compound. These materials of the invention may be formed by reacting (a) a di-, tri- or higher order isocyanate with a reactive fluorochemical monofunctional compound, and (b) optionally with a limited amount of a aliphatic monofunctional compound. The reaction may be carried out in accordance with well-known techniques such as, for example, by condensation in a suitable solvent such as methyl isobutyl ketone (MIBK) using a small amount of a dibutyltin dilaurate catalyst. The urethane compound, formed in such a manner, may be emulsified in water or dissolved in an organic solvent and may optionally be combined with one or more suitable surfactants may be used to stabilize the emulsion.

Preferred aliphatic isocyanates having at least three isocyanate functionalities may be used in the preparation of the fluorochemical polymer. Representative examples of suitable polyfunctional isocyanate compounds include isocyanate functional derivatives of the polyfunctional isocyanate compounds as defined herein. Examples of derivatives include, but are not limited to, those selected from the group consisting of ureas, biurets, allophanates, dimers and trimers (such as uretdiones and isocyanurates) of isocyanate compounds, and mixtures thereof. Any suitable organic polyisocyanate, such as an aliphatic, alicyclic, araliphatic, or aromatic polyisocyanate, may be used either singly or in mixtures of two or more. The aliphatic polyfunctional isocyanate compounds generally provide better light stability than the aromatic compounds.

Examples of useful cycloaliphatic polyfunctional isocyanate compounds include, but are not limited to, those selected from the group consisting of dicyclohexylmethane diisocyanate ($H_{12}$MDI, commercially available as Desmodur™W, available from Bayer Corporation, Pittsburgh, Pa.), 4,4'-isopropyl-bis(cyclohexylisocyanate), isophorone diisocyanate (IPDI), cyclobutane-1,3-diisocyanate, cyclohexane 1,3-diisocyanate, cyclohexane 1,4-diisocyanate (CHDI), 1,4-cyclohexanebis(methylene isocyanate) (BDI), 1,3-bis (isocyanatomethyl)cyclohexane ($H_6$XDI), 3-isocyanatomethyl-3,5,5-trimethylcyclohexyl isocyanate, and mixtures thereof.

Examples of useful aliphatic polyfunctional isocyanate compounds include, but are not limited to, those selected from the group consisting of 1,4-tetramethylene diisocyanate, hexamethylene 1,4-diisocyanate, hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethylene diisocyanate, the biuret of hexamethylene 1,6-diisocyanate (HDI) (available as Desmodur™ N-100 and N-3200 from Bayer Corporation, Pittsburgh, Pa.), the isocyanurate of HDI (available as Demodur™ N-3300 and Desmodur™ N-3600 from Bayer Corporation, Pittsburgh, Pa.), a blend of the isocyanurate of HDI and the uretdione of HDI (available as Desmodur™ N-3400 available from Bayer Corporation, Pittsburgh, Pa.), and mixtures thereof.

Suitable commercially available polyfunctional isocyanates are exemplified by Desmodur™ N-3200, Desmodur™ N-3300, Desmodur™ N-3400, Desmodur™ N-3600, Desmodur™ H (HDI), and Desmodur™ N-100, each available from Bayer Corporation, Pittsburgh, Pa.

Other useful triisocyanates are those obtained by reacting three moles of a diisocyanate with one mole of a triol. For example, toluene diisocyanate, 3-isocyanatomethyl-3,4,4-trimethylcyclohexyl isocyanate, or m-tetramethylxylene diisocyanate can be reacted with 1,1,1-tris(hydroxymethyl) propane to form triisocyanates. The product from the reaction with m-tetramethylxylene diisocyanate is commercially available as CYTHANE 3160 (American Cyanamid, Stamford, Conn.).

Because of their widespread commercial availability, polyisocyanate-functional biurets and isocyanurates derived from the homopolymerization of hexamethylene diisocyanate are preferred for use in accordance with this invention. Such compounds are sold, for example, under the Desmodur tradename, whose products are available from Miles Corp.

Isocyanate group that remain after reaction with the fluorochemical monofunctional compound(s) and the aliphatic monofunctional compound(s) may optionally be blocked isocyanate groups. By the term "blocked isocyanate" is meant a (poly)isocyanate of which the isocyanate groups have been reacted with a blocking agent. Isocyanate blocking agents are compounds that upon reaction with an isocyanate group yield a group that is unreactive at room temperature with compounds that at room temperature normally react with an isocyanate but which group at elevated temperature reacts with isocyanate reactive compounds. Generally, at elevated temperature the blocking group will be released from the blocked (poly)isocyanate compound thereby generating the isocyanate group again which can then react with an isocyanate reactive group. Blocking agents and their mechanisms have been described in detail in "Blocked isocyanates III.: Part. A, Mechanisms and chemistry" by Douglas Wicks and Zeno W. Wicks Jr., Progress in Organic Coatings, 36 (1999), pp. 14 172.

The blocked isocyanate is generally a blocked di- or triisocyanate or a mixture thereof and can be obtained by reacting an isocyanate with a blocking agent that has at least one functional group capable of reacting with an isocyanate group. Preferred blocked isocyanates are blocked polyisocyanates that at a temperature of less than 150° C. are capable of reacting with an isocyanate reactive group, preferably through deblocking of the blocking agent at a known elevated temperature for the blocked material. Preferred blocking agents include arylalcohols such as phenols, lactams such as ε-caprolactam, δ-valerolactam, γ-butyrolactam, oximes such as formaldoxime, acetaldoxime, methyl ethyl ketone oxime, cyclohexanone oxime, acetophenone oxime, benzophenone oxime, 2-butanone oxime or diethyl glyoxime. Further suitable blocking agents include bisulfite and triazoles.

Sheet media described herein are typically made using papermaking processes. Such wet laid processes are particularly useful and many of the fiber components are designed for aqueous dispersion processing. However, the media can be made by air laid processes that use similar components adapted for air laid processing.

The machines used in wet laid sheet making include hand laid sheet equipment, Fourdrinier papermaking machines, cylindrical papermaking machines, inclined papermaking machines, combination papermaking machines and other machines that can take a properly mixed paper, form a layer or layers of the furnish components, remove the fluid aqueous components to form a wet sheet. A fiber slurry containing the materials are typically mixed to form a dilute (0.05 to 5 wt. %) relatively uniform fiber slurry. The fiber slurry is then subjected to a wet laid papermaking process. Once the slurry is formed into a wet laid sheet, the wet laid sheet can then be dried, cured or otherwise processed to form a dry permeable, but real sheet, media, or filter. Once sufficiently dried and processed to filtration media, the sheets are typically about 0.25 to 2 millimeter in thickness, having a basis weight of about 20 to 200 or 30 to 150 g-m$^{-2}$. For a commercial scale process, the bi-component mats are generally processed through the use of inclined wire papermaking-type machines such as commercially available Fourdrinier, wire cylinder, Stevens Former, Roto Former, Inver Former, Venti Former, and inclined Delta Former machines. Preferably, an inclined Delta Former machine is utilized.

A bi-component furnish used to make the layer or web can be prepared by forming pulp and staple or media fiber slurries and combining the slurries in mixing tanks, for example. The amount of water used in the process may vary depending upon the size of the equipment used. The furnish, however, is typically quite dilute and can be greater than about 90, 95 or 99.5 to 99.9 wt. % water. The furnish may be passed into a conventional head box where it is dewatered and deposited onto a moving wire screen where it is dewatered by suction or vacuum to form a non-woven bi-component web. The web can then be coated with a binder by conventional means, e.g., by a flood and extract method and passed through a drying section which dries the mat and cures the binder, and thermally bonds the sheet, media, or filter. The resulting mat may be collected in a large roll.

The medium or media can be formed into substantially planar sheets or formed into a variety of geometric shapes using forms to hold the wet composition during thermal bonding. The media fiber of the invention can include metal, polymer and other related fibers. In forming shaped media, each layer or filter is formed by dispersing fibers in an aqueous system, and forming the filter on a mandrel with the aid of a vacuum. The formed structure is then dried and bonded in an oven. By using a slurry to form the filter, this process provides the flexibility to form several structures; such as, tubular, conical, and oval cylinders.

Certain preferred arrangements include filter media as generally defined, in an overall filter construction. Some preferred arrangements for such use comprise the media arranged in a cylindrical, pleated configuration with the pleats extending generally longitudinally, i.e. in the same direction as a longitudinal axis of the cylindrical pattern. For such arrangements, the media may be imbedded in end caps, as with conventional filters. Such arrangements may include upstream liners and downstream liners if desired, for typical conventional purposes.

Permeability relates to the quantity of air (ft$^3$-min$^{-1}$-ft$^{-2}$) ft-min$^{-1}$ that will flow through a filter medium at a pressure drop of 0.5 inches of water. In general, permeability, as the term is used is assessed by the Frazier Permeability Test according to ASTM D737 using a Frazier Permeability Tester available from Frazier Precision Instrument Co. Inc., Gaithersburg, Md. or a TexTest 3300 or TexTest 3310 available from available from Advanced Testing Instruments Corp (ATI), 243 East Black Stock Rd. Suite 2, Spartanburg, S.C. 29301, (864)989-0566, www.aticorporation.com. Pore size referred to in this disclosure means mean flow pore diameter determined using a capillary flow porometer instrument like Model APP 1200 AEXSC sold by Porus Materials, Inc., Cornell University Research Park, Bldg. 4.83 Brown Road, Ithaca, N.Y.

Preferred crankcase ventilation filters typically have the wet laid media sheet in at least a media stage stacked, wrapped or coiled, usually in multiple layers, for example in a tubular form, in a serviceable cartridge. In use, the serviceable cartridge would be positioned with the media stage oriented for convenient drainage vertically. For example, if the media is in a tubular form, the media would typically be oriented with a central longitudinal axis extending generally vertically.

As indicated, multiple layers, from multiple wrappings or coiling, can be used. A gradient can be provided in a media stage, by first applying one or more layers of wet laid media of first type and then applying one or more layers of a media (typically a wet laid media) of a second, optionally different, type. Typically when a gradient is provided, the gradient involves use of two media types which are selected for differences in efficiency. This is discussed further below.

In the example arrangement described above, an optional first stage and a second stage are described. Wet laid media according to the present description can be utilized in either stage. However typically the media would be utilized in a stage which forms tubular media stages. In some instances when materials according to the present disclosure are used, the first stage of media, characterized as the optional first stage hereinabove, can be avoided entirely, to advantage.

The media composition of the wet laid sheets used to form a stage in a filter is provided in a form having a calculated pore size of at least 10 micron, usually at least 12 micron. The pore size is typically no greater than 60 micron, for example within the range of 12-50 micron, typically 15-45 micron. The media is formulated to have a DOP % efficiency (at 10.5 fpm for 0.3 micron particles), within the range of 3-18%, typically 5-15%.

The media can comprise at least 30% by weight, typically at least 40% by weight, often at least 45% by weight and usually within the range of 45-70% by weight, based on total weight of filter material within the sheet, bi-component fiber material in accord with the general description provided herein. The media comprises 30 to 70% (typically 30-55%), by weight, based on total weight of fiber material within the sheet, of staple or secondary fiber material having average largest cross-sectional dimensions (average diameters is round) of at least 1 micron, for example within the range of 1 to 20 micron. In some instances diameter will be 8-15 micron. The average lengths are typically 1 to 20 mm, often 1-10 mm, as defined. This secondary fiber material can be a mix of fibers. Typically polyester and/or staple or media fibers are used, although alternatives are possible.

Typically and preferably the fiber sheet (and resulting media stage) includes no added binder other than the binder material contained within the bi-component fibers. If an added resin or binder is present, preferably it is present at no more than about 7% by weight of the total fiber weight, and more preferably no more than 3% by weight of the total fiber weight.

Typically, and preferably, the wet laid media is made to a basis weight of at least 20 lbs. per 3,000 square feet (33 gm-m$^{-2}$; 9 kg/278.7 sq. m.), and typically not more than 120 lbs. per 3,000 square feet (195 gm-m$^{-2}$; 54.5 kg/278.7 sq. m.). Usually it will be selected within the range of 30-100 lbs. per 3,000 sq. ft. (49-163 gm-m$^{-2}$; 14 kg-45.4 kg/278.7 sq. m). Typically, and preferably, the wet laid media is made to a Frazier permeability (feet per minute) of 40-500 feet per minute (12-153 meters/min.), typically 100 feet per minute (30 meters/min.). For the basis weights on the order of about 40 lbs/3,000 square feet-100 lbs./3,000 square feet (18-45.4 kg/278.7 sq. meters), typical permeabilities would be about 300-600 feet per minute (92-184 meters/min.). The thickness of the wet laid media sheet(s) used to later form the described media stage in the filter at 0.125 psi (8.6 millibars) will typically be at least 0.01 inches (0.25 mm) often on the order of about 0.018 inch to 0.06 inch (0.45-1.53 mm); typically 0.018-0.03 inch (0.45-0.76 mm).

Media in accord with the general definitions provided herein, including a mix of bi-component fiber(s) and staple or media fiber(s), can be used as any media stage in a filter as generally described above. Typically, and preferably, it will be utilized to form the tubular stage. When used in this manner, it will typically be wrapped around a center core of the filter structure, in multiple layers, for example often at least 5-20 layers, and typically 20-70 layers, although alternatives are possible. Typically, the total depth of the wrapping will be about 0.25-2 inches (6-51 mm), usually 0.5-1.5 (12.7-38.1 mm) inches depending on the overall efficiency desired. Typically, enough media sheets would be used in the final media stage to provide the media stage with overall efficiency measured in this way of at least 70%, at least 85%, and typically 90% or greater. In some instances it would be preferred to have the efficiency at 95% or more. In the context the term "final media stage" refers to a stage resulting from wraps or coils of the sheet(s) of wet laid media.

In crankcase ventilation filters, a calculated pore size within the range of 12 to 80 micron is generally useful. Typically, the pore size is within the range of 15 to 45 micron. Often the portion of the media which first receives gas flow with entrained liquid for designs characterized in the drawings, the portion adjacent the inner surface of tubular media construction, through a depth of at least 0.25 inch (6.4 mm), has an average pore size of at least 20 microns. This is because in this region, a larger first percentage of the coalescing/drainage will occur. In outer layers, in which less coalescing drainage occur, a smaller pore size for more efficient filtering of solid particles, may be desirable in some instances. The term X-Y pore size and variants thereof when used herein, is meant to refer to the theoretical distance between fibers in a filtration media. X-Y refers to the surface direction versus the Z direction which is the media thickness. The calculation assumes that all the fibers in the media are lined parallel to the surface of the media, equally spaced, and ordered as a square when viewed in cross-section perpendicular to the length of the fibers. The X-Y pore size is a distance between the fiber surface on the opposite corners of the square. If the media is composed of fibers of various diameters, the d$^2$ mean of the fiber is used as the diameter. The d$^2$ mean is the square root of the average of the diameters squared. It has been found that it is useful to have calculated pore sizes on the higher end of the preferred range, typically 30 to 50 micron, when the media stage at issue has a total vertical height, in the crankcase ventilation filter of less than 7 inches (178 mm); and, pore sizes on the smaller end, about 15 to 30 micron, are sometimes useful when the filter cartridge has a height on the larger end, typically 7-12 inches (178-305 mm). Taller filter stages may provide for a higher liquid head, during coalescing, which can force coalesced liquid flow, under gravity, downwardly through smaller pores, during drainage. The smaller poresallow for higher efficiency and fewer layers. In a typical operation in which the same media stage is being constructed for use in a variety of filter sizes, typically for at least a portion of the wet laid media used for the coalescing/drainage in initial separation, an average pore size of about 30-50 microns will be useful.

Solidity is the volume fraction of media occupied by the fibers expressed as a percentage of volume (%). It is the ratio of the fibers volume per unit mass divided by the media's volume per unit mass. Typical wet laid materials preferred for use in media stages according to the present disclosure, especially as the tubular media stage in arrangements such as those described above in connection, have a percent solidity at 0.125 psi (8.6 millibars) of under 10%, and typically under 8%, for example 6-7%. The thickness of media utilized to make media packs according to the present disclosure, is typically measured using a dial comparator such as an Ames #3W (BCA Melrose Mass.) equipped with a round pressure foot, one square inch. A total of 2 ounces (56.7 g) of weight is applied across the pressure foot. Typical, wet laid media sheets useable to be wrapped or stacked to form media arrangements, according to the present disclosure, have a thickness of at least 0.01 inches (0.25 mm) at 0.125 psi (8.6 millibars), up to about 0.06 inches (1.53 mm), again at 0.125 psi (8.6 millibars). Usually, the thickness will be 0.018-0.03 inch (0.44-0.76 mm) under similar conditions.

The media described herein have a preferred DOP efficiency at 10.5 ft/minute (3.2 m-min$^{-1}$) for 0.3 micron particles for layers or sheets of wet laid media. This requirement indicates that a number of layers of the wet laid media will typically be required, in order to generate an overall desirable efficiency for the media stage of typically at least 70%, at least 85% or often 90% or greater, in some instances 95% or greater. In general, DOP efficiency is a fractional efficiency of a 0.3 micron DOP particle (dioctyl phthalate) challenging the media at 10.5 fpm. A TSI model 3160 Bench (TSI Incorporated, St. Paul, Minn.) can be used to evaluate this property. Model dispersed particles of DOP are sized and neutralized prior to challenging the media. The wet laid filtration media accomplishes strength through utilization of added binders. However, this may compromise the efficiency and permeability, and increase solidity. Thus, as indicated above, the wet laid media sheets and stages according to preferred embodiments herein typically include no added binders, or if binder is present it is at a level of no greater than 7% of total fiber weight, typically no greater than 3% of total fiber weight.

Strength properties that generally define media gradings include stiffness, tensile and resistance to compression. In general, utilization of bi-component fibers and avoidance of polymeric binders leads to a lower stiffness with a given or similar resistance to compression and also to good tensile. Machine direction tensile is the breaking strength of a thin strip of media evaluated in the machine direction (MD). Reference is to Tappi 494 using the following test conditions: sample width, 1 inch (25.4 mm); sample length, 4 inch gap (101.6 mm); pull rate-2 inches/minute (50.8 mm/minute).

Modification of the surface characteristics of the fibers in media, such as increasing the contact angle with water, should enhance the drainage capability of the filtration media and thus the performance of a filter (reduced pressure drop and improved mass efficiency). Fluoro-organic wetting agents useful in this invention for addition to the fiber layers are $C_{2-12}$ fluoroorganic molecules. Preferably, a chemical with a chemically stable saturated perfluoroaliphatic organic group is used. However, hydrogen or chlorine atoms can be present as substituents on the skeletal chain. Various fibers are used in the design of for example filtration media used for low pressure filters such as mist filters or others (less than 1 psi terminal pressure drop).

One method of modifying the surface of the fibers is to apply a surface treatment such as a fluorochemical or silicone containing material, 0.001 to 5% or about 0.01 to 2.5% by weight of the media. The surface characteristics of the fibers can be modified in a wet laid layer that can include bi-component fibers, other secondary fiber such as a synthetic, ceramic or metal fibers with and without additional resin binder. The resulting media could be incorporated into filter element structures with a thickness generally greater than 0.05 inches often about 0.1 to 0.25 inches. The media would have larger XY pore size than conventional air media, generally greater than 10 often about 15 to 100 micron, and would be composed of larger size fibers, generally greater than 6 micron although in certain cases small fibers could be used to enhance efficiency. The use of surface modifiers may allow the construction of media with smaller XY pore sizes than untreated media, thereby increasing efficiency with the use of small fibers, reduce the thickness of the media for more compact elements, and reduce the equilibrium pressure drop of the element.

In the case of mist filtration, the system can be designed to drain the collected liquids. The opposite of drainage is mass increase or weight gain during filtration. Both maximum drainage and minimum weight gain is a desirable result of using the media and filter arrangements described herein. Media in both the pre-filter and primary element are positioned so that the liquid can drain from the media. Important performance properties for these two elements are: initial and equilibrium fractional efficiency, pressure drop, and drainage ability. Important physical properties of the media are thickness, solidity, and strength.

The elements are typically aligned vertically which enhances the filter's capability to drain. In this orientation, any given media composition will exhibit a equilibrium liquid height which will be a function of the XY pore size, fiber orientation, and the interaction of the liquid with the fibers' surface, measured as contact angle. The collection of liquid in the media will increase the height to a point balanced with the drainage rate of liquid from the media. Any portion of the media that is plugged with draining liquid would not be available for filtration thus increasing pressure drop and decreasing efficiency across the filter. Thus, it is advantageous to minimize the portion of the element that retains liquid.

The three media factors effecting drainage rate, XY pore size, fiber orientation, and interaction of the liquid being drained with the fiber's surface, can all be modified to minimize the portion of the media that is plugged with liquid. The XY pore size of the element can be increased to enhance the drainage capability of the media but should be balanced against the resultant effect of reducing the number of fibers available for filtration, and thus the potential efficiency of the filter. To achieve target efficiency, a relatively thick element structure may be needed, typically greater than 0.125 inches, due to the need for a relatively large XY pore size. The fibers can be oriented with the vertical direction of the media. The interaction of the liquid being drained with the surface of the fibers can be modified to enhance the drainage rate.

In one application, crank case filtration applications, small oil particle mists are captured, collect in the element and eventually drain from the element back into the engine's oil sump. Filtration systems installed on the crank case breather of diesel engines can be composed of multiple elements, a pre-filter that removes large particles generally greater than 5 microns and a primary filter that removes the bulk of the residual contamination. The primary element can be composed of single or multiple layers of media. The composition of each layer can be varied to optimize efficiency, pressure drop and drainage performance.

Due to filtration system size constraints, the pre and primary elements must be designed for equilibrium fractional efficiency or average mass increase. Equilibrium fractional efficiency is defined as the element's efficiency once the element is draining liquid at a rate equal to the collection rate. The three performance properties, initial and equilibrium fractional efficiency, pressure drop, and drainage ability, are balanced against the element's design to achieve optimum performance. Thus, as an example, short elements in a high liquid loading environment must be designed to drain at a relatively fast rate.

In one preferred embodiment of the invention, the filtration medium or media is comprised of a thermally bonded sheet. The sheet is comprised of about 20 to 80 wt % of a first sheath-core bi-component binder fiber and about 5 to 20 wt % of an optional second bi-component fiber. The first bi-component fiber has a core polymer with a melting point of about 240 to 260° C. and a sheath melting point of about 140 to 160° C. The optional second bi-component fiber has a core polymer with a melting point of 240 to 260° C. and a sheath polymer with a melting point at least 10° C. less than the first bicomponent fiber and can range from about 70 to 140° C., 75 to 120° C., or 75 to 110° C. The media or web also comprises about 20 to 80 wt % of a staple or media fiber. Each of the bi-component binder fibers has a diameter of about 5 to 50 micrometers and a length of about 0.1 to 15 cm. The staple or media fiber has a diameter of about 0.1 to 30 micrometers and an aspect ratio of about 10 to 10,000. The media has a thickness of about 0.2 to 50 mm, a solidity of about 2 to 25%, a basis weight of about 10 to 1000 g-m$^{-2}$, a pore size of about 0.5 to 100 micrometers and a permeability of about 5 to 500 ft-min$^{-1}$. The media is comprised of about 0.5 to 15 wt % of a secondary fiber. The media is comprised of a single layer or two or more layers. The media is comprised of about 0.01 to 10 wt % of a fluoro-organic agent. Example embodiments of different media compositions are shown in Table 1 and Table 2:

TABLE 1

| Component | Example of Useful Fiber | Wt. % | Wt. % | Wt. % | Wt. % |
|---|---|---|---|---|---|
| BICO | 271 P | 0-40 | 0-35 | 2-30 | 5-25 |
| BICO | TJ04 BN | 20-80 | 25-75 | 20-65 | 25-60 |
| Staple fiber | Cotton or PET | 20-80 | 20-80 | 25-75 | 30-70 |
| Optional Fluorochemical | Fluoro-acrylate | 0.0 | 0.05-10 | 0.10-8 | 0.2-5 |

TABLE 2

| Component | Example of Useful Fiber | Wt. % | Wt. % | Wt. % | Wt. % |
|---|---|---|---|---|---|
| BICO | 271 P | 0-40 | 0-35 | 2-30 | 5-25 |
| BICO | TJ04 BN | 20-80 | 25-75 | 20-65 | 25-60 |
| Staple Fiber | Cellulose Fiber or Cotton Linter Fiber | 10-40 | 10-40 | 12-38 | 15-35 |
| Staple Fiber | PET Monofilament | 10-40 | 10-40 | 12-38 | 15-35 |

A method of the invention embodies filtering a liquid stream, where the method is comprised of placing a filter unit into the steam and retaining solid particulate entrained in the stream on the filter surface using filter media within the filter unit. The filter media is comprised of a thermally bonded sheet. The thermally bonded sheet is comprised of about 10 to 90 wt % of the total of a first and an optional second bi-component binder fiber and about 10 to 90 wt % of a media fiber. The optional fiber is used at about 0-40 wt. %, 2 to 30 wt. % or 5-25 wt. %. The bi-component binder fiber has a diameter of about 5 to 50 micrometers and a length of about 0.1 to 15 cm. The media fiber has a diameter of about 0.1 to 5 micrometers and an aspect ratio of about 10 to 10,000. The media has a thickness of about 0.1 to 2 mm, a solidity of about 2 to 25%, a basis weight of about 2 to 200 g-m$^{-2}$ a pore size of about 0.2 to 50 micrometers and a permeability of about 2 to 200 ft-min$^{-1}$ (0.6-60 m-min$^{-1}$). The liquid to be filtered may be either an aqueous liquid or a non-aqueous liquid. The media is comprised of a single layer or two or more layers. The media is comprised of about 0.01 to 10 wt % of a fluoro-organic agent.

Another method of the invention embodies filtering a gaseous fluid. The method is comprised of passing a gaseous mobile fluid phase containing a liquid aerosol contaminant (that can also contain a solid particulate) through a filter medium, the medium having a thickness of about 0.2 to 50 mm, the medium comprising a thermally bonded sheet, and removing the contaminant. The sheet is comprised of about 10 to 80 wt % of a first and an optional second bi-component binder fiber and about 20 to 80 wt % of a staple or media fiber. The optional fiber at about 0-40 wt. %, 2 to 30 wt. % or 5-25 wt. %. The bi-component binder fiber has a diameter of about 5 to 50 micrometers and a length of about 0.1 to 15 cm. The staple or media fiber has a diameter of about 0.1 to 30 micrometers. The media has a solidity of about 2 to 25%, a basis weight of about 10 to 1000 g-m$^{-2}$, a pore size of about 0.5 to 100 micrometers and a permeability of about 5 to 500 ft-min$^{-1}$ (1.5-152 m-min$^{-1}$), the mobile fluid phase having a temperature greater than the melting point of the second component. In one embodiment of the method described the fluid is a gas or liquid. In one embodiment of the method described the liquid is an aqueous liquid, fuel, lubricant oil or hydraulic fluid. In one embodiment of the method described, the contaminant is a liquid or solid.

Another method of the invention embodies filtering a heated gas or liquid fluid. The method is comprised of passing a mobile fluid phase containing a contaminant through a filter medium, the medium having a thickness of about 0.2 to 50 mm, the medium comprising a thermally bonded sheet, and removing the contaminant. The sheet is comprised of about 20 to 80 wt % of a biocomponent binder fiber and about 20 to 80 wt % of a staple or media fiber. The bi-component binder fiber has a first component with a melting point and a second component with a lower melting point. The bi-component binder fiber has a diameter of about 5 to 50 micrometers and a length of about 0.1 to 15 cm. The staple or media fiber has a diameter of about 0.1 to 30 micrometers. The media has a solidity of about 2 to 25%, a basis weight of about 10 to 1000 g-m$^{-2}$, a pore size of about 0.5 to 100 micrometers and a permeability of about 5 to 500 ft-min$^{-1}$ (1.5-152 m-min$^{-1}$), the mobile fluid phase having a temperature greater than the melting point of the second component. In one embodiment of the method described the fluid is a gas or liquid. In one embodiment of the method described the liquid is an aqueous liquid, fuel, lubricant oil or hydraulic fluid. In one embodiment of the method described, the contaminant is a liquid or solid.

The medium described herein can be assembled with other conventional filter structures to make a filter composite layer or filter unit. The medium can be assembled with a base layer which can be a membrane, a cellulosic medium, a synthetic medium, a scrim or an expanded metal support. The medium can be used in conjunction with many other types of media, such as conventional media, to improve filter performance or lifetime.

A perforate structure can be used to support the media under the influence of fluid under pressure passing through the media. The filter structure of the invention can also be combined with additional layers of a perforate structure, a scrim, such as a high-permeability, mechanically-stable scrim, and additional filtration layers such as a separate loading layer. In one embodiment, such a multi-region media combination is housed in a filter cartridge commonly used in the filtration of non-aqueous liquids.

In one embodiment, a method of making a nonwoven web includes dispensing a fluid stream from a first source, wherein the fluid stream includes fiber. The method further includes collecting fiber on a receiving region situated proximal and downstream to the source. The receiving region is designed to receive the flow stream dispensed from the source and form a wet layer by collecting the fiber. A further step of the method is drying the wet layer to form the nonwoven web.

In another embodiment, a method of making a nonwoven web includes providing a furnish from a source, the furnish including at least a first fiber, and dispensing a stream of the furnish from an apparatus for making a nonwoven web. The method further includes collecting fiber passing through the opening on a receiving region situated downstream from the source, collecting a remainder of fiber on the receiving region at a downstream portion of the mixing partition, and drying the wet layer to form the nonwoven web.

In one wet laid processing embodiment, the medium is made from an aqueous furnish comprising a dispersion of fibrous material and other components as needed in an aqueous medium. The aqueous liquid of the dispersion is generally water, but may include various other materials such as pH adjusting materials, surfactants, defoamers, flame retardants, viscosity modifiers, media treatments, colorants and the like. The aqueous liquid is usually drained from the dispersion by conducting the dispersion onto a screen, inclined screen or other perforated support retaining the dispersed solids and passing the liquid to yield a wet media composition.

The wet composition, once formed on the support, is usually further dewatered by vacuum or other pressure forces and further dried by evaporating the remaining liquid. Options for removal of liquid include gravity drainage devices, one or more vacuum devices, one or more table rolls, vacuum foils, vacuum rolls, or a combination thereof. The apparatus can include a drying section proximal and downstream to the receiving region. Options for the drying section include a drying can section, one or more IR heaters, one or more UV heaters, a through-air dryer, a transfer wire, a conveyor, or a combination thereof.

After liquid is removed, heating to induce thermal bonding can take place where appropriate by melting some portion of the thermoplastic fiber, resin or other portion of the formed web material. Other post-treatment procedures are also possible in various embodiments, including chemical treatment, resin curing steps. Pressing, heat treatment and additive treatment are examples of post-treatment that can take place prior to collection from the wire. After collection from the wire further treatments such drying and calendaring of the fibrous mat may be conducted in finishing processes.

One specific machine that can be used as described herein is the Deltaformer™ machine (available from Glens Falls Interweb, Inc. of South Glens Falls, N.Y.), which is a machine designed to form very dilute fiber slurries into fibrous media. Such a machine is useful where, e.g. inorganic or organic fibers with relatively long fiber lengths for a wet-laid process are used, because large volumes of water must be used to disperse the fibers and to keep them from entangling with each other in the furnish. Long fiber in wet laid process typically means fiber with a length greater than 4 mm, that can range from 5 to 10 mm and greater. Nylon fibers, bi-component fiber, cotton linter, polyester fibers (such as Dacron®), regenerated cellulose (rayon) fibers, acrylic fibers (such as Orlon®), cotton fluff fibers, polyolefin fibers (i.e. polypropylene, polyethylene, copolymers thereof, and the like), and abaca (Manila Hemp) fibers are examples of fibers that are advantageously formed into fibrous media using such a modified inclined papermaking machine.

The Deltaformer™ machine differs from a traditional Fourdrinier machine in that the wire section is set at an incline, forcing slurries to flow upward against gravity as they leave the headbox. The incline stabilizes the flow pattern of the dilute solutions and helps control drainage of dilute solutions. A vacuum forming box with multiple compartments aids in the control of drainage. These modifications provide a means to form dilute slurries into fibrous media having improved uniformity of properties, across the web when compared to a traditional Fourdrinier design.

In one embodiment of the wet section, mixtures of fibers and fluid are provided as a furnish after a separate furnish making process. The furnish can be mixed with additives before being passed onto the next step in the medium forming process. In another embodiment, dry fibers can be used to make the furnish by sending dry fibers and fluid through a refiner which can be part of the wet section. In the refiner, fibers are subjected to high pressure pulses between bars on rotating refiner discs. This breaks up the dried fibers and further disperses them in fluid such as water that is provided to the refiner. Washing and de-aeration can also be performed at this stage.

After furnish making is complete, the furnish can enter the structure that is the source of the flow stream, such as a head box. The source structure disperses the furnish across a width loads it onto a moving wire mesh conveyor with a jet from an opening. In some embodiments described herein, two sources or two headboxes are included in the apparatus. Different headbox configurations are useful in providing media. In one configuration, top and bottom headboxes are stacked right on top of each other. In other configuration, top and bottom headboxes are staggered somewhat. The top headbox can be further down the machine direction, while the bottom headbox is upstream.

In one embodiment, the jet is a fluid that urges, moves or propels a furnish, such as water or air. Streaming in the jet can create some fiber alignment, which can be partly controlled by adjusting the speed difference between the jet and the wire mesh conveyor. The wire revolves around a forward drive roll, or breast roll, from under the headbox, past the headbox where the furnish is applied, and onto what is commonly called the forming board.

The forming board works with the furnish, which is leveled and alignment of fibers can be adjusted in preparation for water removal. Further down the process line, drainage boxes (also referred to as the drainage section) remove liquid from the medium with or without vacuum. Near the end of the wire mesh conveyor, another roll often referred to as a couch roll removes residual liquid with a vacuum that is a higher vacuum force than previously present in the line.

The medium described herein can be assembled with other conventional filter structures to make a filter composite layer or filter unit. The medium can be assembled with a base layer which can be a membrane, a cellulosic medium, a synthetic medium, a scrim or an expanded metal support. The medium can be used in conjunction with many other types of media, such as conventional media, to improve filter performance or lifetime.

A perforate structure can be used to support the media under the influence of fluid under pressure passing through the media. The filter structure of the invention can also be combined with additional layers of a perforate structure, a scrim, such as a high-permeability, mechanically-stable scrim, and additional filtration layers such as a separate loading layer. In one embodiment, such a multi-region media combination is housed in a filter cartridge commonly used in the filtration of non-aqueous liquids.

The non-woven webs of the invention include fibers in a thermally bonded web, wherein the web includes a bi-component fiber having a core polymer and a shell polymer, the shell having a melting point that is greater than about 115° C., wherein the bi-component fiber has a diameter of about 5 to 25 μm and a length of about 2 to 15 μm; and a cellulosic or synthetic polymer fiber; wherein the web is substantially free of a glass fiber. The shell polymer melting point can be between 120° C. and 180° C., and in preferred embodiments about 140° C. to 160° C. In core/shell embodiments, the core polymer melting point temperature is higher than the melting point of the shell. In some embodiments, the second, or core, polymer melting point is at least about 240° C. The bi-component fiber diameter is about 5 to 50 micrometers often about 10 to 20 micrometers and typically in a fiber form generally have a length of 0.1 to 20 millimeters or often have a length of about 0.2 to 15 millimeters.

In some embodiments of the non-woven webs of the invention described above, the thermally bonded web has about 1 to 30 wt. % of the bi-component fiber and 70 to 99 wt. % of the staple fiber, and the web has a thickness of about 0.2 to 2 mm, a solidity of about 1 to 20% or about 2 to 10%, a basis weight of about 45 to 150 g-m$^{-2}$, a pore size of about 12 to 50 microns, and a permeability of about 1.5 to 3 m/sec. In some embodiments, the thermally bonded web has about 0.1 to 50 wt % of the bi-component fiber and about 50 to 99.9 wt % of the staple fiber. In some embodiments the web has a thickness of about 0.1 mm to 2 cm. In some embodiments the web has a solidity of about 1 to 20%. In some embodiments the web has a basis weight of about 20 to 300 g-m$^{-2}$ or about 50 to 130 g-m$^{-2}$. In some embodiments, the web has a pore size of about 5 to 150 microns. In some embodiments, the web has a permeability of about 0.5 to 10 m/sec. In some embodiments, the staple fiber is either about 1 to 20 wt-% of a cellulosic fiber or about 10 to about 50 wt % of a polyester fiber.

In some embodiments of the nonwoven webs described above, the staple fiber is a blend of both cellulosic fiber and polyester fiber, wherein the blend is composed of about 1 to 20 wt-% of a cellulosic fiber and about 10 to about 50 wt % of a polyester fiber relative to the weight of the web. In some embodiments, the staple fiber is either about 5 to 15 wt-% of a cotton linter fiber or about 10 to about 50 wt % of a polyester fiber. In some embodiments the staple fiber is a blend of both cotton linter fiber and polyester fiber, wherein the blend is composed of about 5 to 15 wt-% of a cotton linter fiber and about 10 to about 50 wt % of a polyester fiber relative to the weight of the web. In some embodiments, the web has about 1 to 30 wt. % of the bi-component fiber and 70 to 99 wt. % of the staple fiber, and the web has a thickness of about 0.2 to 2 mm, a solidity of about 1 to 20% or about 2 to 10%, a basis weight of about 45 to 150 g-m$^{-2}$, a pore size of about 12 to 50 microns, and a permeability of about 1.5 to 3 m/sec. In some embodiments, the thermally bonded web has about 0.1 to 50 wt % of the bi-component fiber and about 50 to 99.9 wt % of the staple fiber. In some embodiments the web has a thickness of about 0.1 mm to 2 cm. In some embodiments the web has a solidity of about 1 to 20%. In some embodiments the web has a basis weight of about 20 to 300 g-m$^{-2}$ or about 50 to 130 g-m$^{-2}$. In some embodiments, the web has a pore size of about 5 to 150 microns. In some embodiments, the web has a permeability of about 0.5 to 10 m/sec. In some embodiments, the staple fiber is either about 1 to 20 wt-% of a cellulosic fiber or about 10 to about 50 wt % of a polyester fiber.

In embodiments, the non-woven webs of the invention include fibers in a thermally bonded web, wherein the web includes
  (a) about 1 to 30 wt. % based on the weight of the web of a first bi-component fiber having a first core polymer and a first shell polymer, wherein the first shell polymer has a melting point of up to 115° C., and the first bi-component fiber has a diameter of about 5 to 25 gm and a length of about 2 to 15 mm;
  (b) about 5 to 50 wt. % based on the weight of the web of a second bi-component fiber having a second core polymer and a second shell polymer, wherein the second shell polymer has a melting point of about 120° C. to 170° C.; and the second bi-component fiber has a fiber diameter of about 5 to 25 microns and a fiber length of about 2 to 15 mm; and
  (c) about 10 to 80 wt. % based on the weight of the web of a staple fiber; wherein the web has the thickness of about 0.25 to 2 mm, a solidity of about 5-10%, a basis weight of about 45 to 150 g-m$^{-2}$, a pore size of about 12 to about 50 microns, and a permeability of about 1.5 to 3 m/sec. In some such embodiments, the melting point of the second shell polymer is about 140° C. to 160° C. In some such embodiments, the first bi-component fiber and the second bi-component fiber are core/shell fibers having first and second core polymers having a melting point of 240 to 260° C. In some such embodiments, the web has a basis weight of about 50 to about 130 g-m$^{-2}$. In some such embodiments, the web is substantially glass free. In some such embodiments the staple fiber includes about 1 to 20 wt-% of a cellulosic fiber and about 10 to 50 wt % of a polyester fiber. In some such embodiments the staple fiber includes about 5 to 15 wt-% of a cotton linter fiber and about 10 to 50 wt % of a polyester fiber.

In embodiments, the non-woven webs of the invention include fibers in a thermally bonded web that is substantially free of a glass fiber, wherein the web includes
  (a) about 1 to 15 wt. % of a first bi-component fiber having a first core polymer with a melting point of 240° to 260° C. and a first shell polymer with a melting point of 100° to 115° C.; wherein the first bi-component fiber has a diameter of about 10 to 15 gm and a fiber length of about 0.3 to 0.9 cm;
  (b) about 5 to 50 wt. % of a second bi-component fiber having a second core polymer with a melting point of 240° to 260° C. and a second shell polymer with a melting point of 120° to 160° C.; wherein the second bi-component fiber has a diameter of about 10 to 15 microns and a fiber length of about 0.3 to 0.9 centimeters;
  (c) about 1 to 20 wt. % of a cotton linter fiber; and
  (d) about 10 to 50 wt. % of a polyester fiber.
In some such embodiments, the melting point of the second shell polymers is about 140°-160° C. In some such embodiments the polyester fiber comprises about 1 to 20 wt. % of a staple fiber having a diameter of 7 to 15 gm and a cellulosic or cotton fiber having a diameter of 15 to 55 gm, and the ratio of the diameters of the first polyester fiber to the second polyester fiber is about 1:1.2 to 5.

Embodiments of the invention include method of making a nonwoven web including a thermally bonded web, the method involving:
  (a) forming a furnish including an aqueous concentration of solids of about 0.005 to 5 or 0.005 to 7 wt. % the solids including about 20 to about 60 wt. % of a bi-component fiber, about 5 to about 25 wt. % of a cotton linter fiber, and about 10 to 50 wt. % of a staple polyester fiber having a diameter of about 7 to about 15 gm and a fiber length of about 3 to about 10 mm;
  (b) contacting the furnish with an inclined screen to form a wet layer; and
  (c) drying wet layer to form a web.
In some such embodiments, the polyester fiber includes about 1 to 20 wt. % of a staple fiber having a diameter of 7 to 15 gm and a cellulosic or cotton fiber having a diameter of 15 to 55 gm, and the ratio of the diameters of the first polyester fiber to the second polyester fiber is about 1:1.2 to 1:5.

Furnishes were formulated to produce nonwoven webs having improved properties property. Examples 1-3 shows compositional information about the furnish formulations. The following different fibers were used in the furnish examples listed in Table 1, where an abbreviation for each fiber is provided in parenthesis:
  1. A polyester bi-component fiber known as 271P available from E. I. DuPont Nemours, Wilmington Del. with a sheath melt temperature of about 73° C. The average fiber diameter of 271P is about 13 microns and length is 6 mm.

2. Bi-component fiber known as a short-cut fiber made of a polyester/co-polyester mix, consisting of 49.5% polyethylene terephthalate, 47% co-polyester and 2.5% polyethylene copolymer (BI—CO). One example of such a fiber is TJ04BN SD 2.2X5 available from Teijin Fibers Limited of Osaka, Japan with a sheath melt temperature of about 155° C. The average fiber diameter is 13 microns and length is 6 mm.

3. Cellulosic cotton linter fiber Buckeye Corp source fiber.

4. Polyester Fiber (P20FM) or Invista 205 WSD available from Barnet USA of Arcadia, S.C.

In these examples, sulfuric acid was added to adjust the pH to approximately 3.0 to disperse the fibers in the aqueous suspension. The fiber content was approximately 0.03% (wt. %) in the aqueous suspensions of the furnishes used to make the media in the examples. The furnishes containing dispersed fibers were stored in their respective machine chests (storage tanks) for subsequent use. During media manufacturing, the furnish streams were fed to their respective headboxes after appropriate dilution.

TABLE 3

Exemplary Materials

| Function | Fiber Identity | % |
|---|---|---|
| Example 1 | | |
| Bi-component Binder Fiber | TJ04BN | 39.2 |
| Bi-component Binder Fiber | 271P | 9.8 |
| Staple Fiber 1 - Buckeye Cellulose 512 | Cotton linter 29 μm | 7.35 |
| Staple Fiber 2 - Invista 205 WSD PET | 7.2 μm PET | 41.65 |
| Hydrophobic Additive - Phobol | $C_6$ Fluorochemical Poly-fluoro-acrylic Additive | 2 |
| Example 2 | | |
| Binder Fiber | TJ04BN | 40 |
| Binder Fiber | 271P | 10 |
| Staple Fiber1-Buckeye 512 | 512 Cotton Linters | 7.5 |
| StapleFiber 2 - Invista PET | 205WSD | 42.5 |
| Example 3 | | |
| Binder Fiber | TJ04BN | 40 |
| Binder Fiber | 271P | 10 |
| Staple Fiber 1 - Buckeye 512 | 512 Cotton Linters | 10 |
| Staple Fiber 2 - Invista PET | 205WSD | 17.5 |
| Staple Fiber 3 - Barnet | P30FM staple PET | 22.5 |

TABLE 4

Comparative Materials

| Function | Fiber Identity | % |
|---|---|---|
| Comparative Example 1 | | |
| Bi-component Binder Fiber | 271P | 50 |
| Staple PET | 205WSD | 40 |
| Glass fiber Owens Corning | 11 μm glass | 10 |
| Comparative Example 2 | | |
| Bi-component Binder Fiber | TJ04BN | 40 |
| Binder Fiber | 271P | 10 |
| Staple glass | 11 μm glass | 10 |
| Staple PET | 205WSD | 7 |

Other variables on the machine that are adjusted during the formation of the media include pulper consistency, incline angle of the initial mixing partition, incline angle of the machine, incline angle of the extended mixing partition, basis weight, machine speed, heel height, furnish flow, head box flow, head box consistency, and drainage box collection. Resultant media may be post-treated, typically with a single web treatment process step, for example, with chemical treatment, additives, calendaring, heat or other methods and equipment familiar in the art to provide a finished gradient fibrous mat.

Tensile breaking strength of test sample strips, and breaking load and stretch are measured following the procedure in TAPPI T 404. Additional requirements for testing of pulp hand sheets are detailed in standard TAPPI 220. These include evaluation of bursting strength, tensile breaking load; breaking length and tear factor. Tensile Energy Absorption—Tensile energy absorption (TEA) of paper is defined as the area under the load-elongation curve (i.e., energy) related to the surface area of paper between the grips. This result is typically used to characterize the energy absorbing capacity of paper (see TAPPI T 494), and use of a microprocessor or computer to calculate energy greatly simplifies data reduction. Measuring Stretch—The amount of stretch in paper and board is a critical measure of quality, since it is a necessary requirement for a sheet to fold well and resist local stress when used in packaging, corrugated board and tissues. We suggest that after initially clamping a sample in the upper grip, to apply a small stress to remove waviness. The sample is then pulled to rupture within a specified time, as detailed in T 457. When TEA measurement is required, a constant rate of elongation tester with a plotter in accordance with TAAPPI specification T494-os is used. A sample is made using a 1×6" die cutter. The sample is cured, if needed, in an oven capable of maintaining 149° C. In the test two representative samples having dimensions of 178×178 mm are taken. Care is taken to make sure that the samples have been cured at or above the melting point of the microphone fiber. From the samples, three specimens in each of the machine and cross machine direction having dimensions of 25.4×152 mm are obtained. The specimens are dried for 24 hours. If the specimens are to be tested in a white condition the specimens are immersed into distilled water containing 1% Triton-100 surfactant. Once saturated the samples are removed blotted to remove excess liquid and tested. The samples are clamped into the tester in the upper and lower jaw set at 4 inches apart. The tester is set to stress the sample at 2 in./min. The tester is operated and any specimen failure is noted. If no failure as noted, the tensile breaking strength and pounds or kilograms force is recorded. Using the data the average tensile breaking strength or TE a resulting from three successful tests is reported along with the wet or dry nature of the sample the machine direction and any other relevant notation.

TABLE 5

Tensile data

TEA Tensile Testing

| Media Comparison | Parameter | Comp. Ex. 1 | Ex. 4 |
|---|---|---|---|
| Burst | kPa | 175 | 208 |
| Burst | psi | 25.4 | 30.2 |

Hot Tensile Testing

| Test Temp | Parameter | Comparative Ex. 1 | Example 4 |
|---|---|---|---|
| 22° C. | lbs/inch | 4.52 | 8.02 |
| 80° C. | lbs/inch | 2.9 | 4.3 |
| 100° C. | lbs/inch | 1.42 | 2.6 |
| 110° C. | lbs/inch | 0.79 | 2.1 |
| 120° C. | lbs/inch | 0.07 | 2 |
| 130° C. | lbs/inch | 0 | 1.2 |
| 135° C. | lbs/inch | 0 | 1 |
| 140° C. | lbs/inch | 0 | 0.67 |

In these tables, the burst strength and hot tensile strength of the claimed materials is better than the comparative examples and the improved strength as temperature is increased is also seen.

While the invention has been described in connection with specific embodiments thereof, it will be understood that it is capable of further modifications and this application is intended to cover any variations, uses, or adaptations of the invention following, in general, the principles of the invention and including such departures from the present disclosure as come with known or customary practice within the art to which the invention pertains and as may be applied to the essential features hereinbefore set forth and as follows in scope of the appended claims.

We claim:

1. A nonwoven web comprising fibers in a thermally bonded sheet, the nonwoven web comprising:
    (a) about 5 wt-% to about 25 wt-% of a first bi-component fiber comprising a first core polymer with a melting point of 240° C. or greater and a first shell polymer with a melting point of 115° C. or lower; wherein the first bi-component fiber has a diameter of about 5 μm to about 25 μm;
    (b) about 25 wt-% to about 60 wt-% of a second bi-component fiber comprising a second core polymer with a melting point of 240° C. or greater and a second shell polymer with a melting point of 120° C. or greater and lower than the melting point of the second core polymer; wherein the second bi-component fiber has a diameter of about 5 μm to 25 μm; and
    (c) a staple fiber,
    wherein the nonwoven web has a solidity of 10% or less.

2. The nonwoven web of claim 1, wherein the melting point of the second shell polymer is in a range of 140° C. to 180° C.

3. The nonwoven web of claim 1, wherein the staple fiber comprises about 1 wt-% to 20 wt-% of a polyester fiber having a diameter of 7 to 15 μm and about 10 wt-% to 50 wt-% of cotton linter fiber having a diameter of 15 μm to 55 μm.

4. The nonwoven web of claim 1, wherein the web exhibits a wet bursting strength of 5 lb/in$^2$ or greater.

5. The nonwoven web of claim 1, wherein the web exhibits a wet bursting strength of 10 lb/in$^2$ to 20 lb/in$^2$.

6. The nonwoven web of claim 1, wherein the web has a tensile strength of 2 lb/in or greater at 100° C.

7. The nonwoven web of claim 1, wherein the web comprises from 0.5 wt-% to 5 wt-% of a $C_2$ to $C_9$ fluorochemical treatment, based on a total weight of the web.

8. The nonwoven web of claim 7, wherein the fluorochemical comprises a $C_{2-6}$ fluoroalkyl acrylic polymer.

9. The nonwoven web of claim 7, wherein the fluorochemical comprises a $C_6$ fluoroalkyl acrylic polymer.

10. The nonwoven web of claim 1, wherein the fibers comprise a treatment on the fibers of about 2 wt-% of a $C_6$ fluoroalkyl acrylic polymer.

11. The nonwoven web of claim 1, wherein the staple fiber comprises cotton, polyester, cellulose, or a combination thereof.

12. The nonwoven web of claim 11, wherein the staple fiber comprises cotton linter and polyester fibers.

13. A filter element comprising the nonwoven web of claim 1.

14. The filter element of claim 13, wherein the filter element comprises filter media comprising two or more layers of the nonwoven web.

15. The filter element of claim 13, wherein the two or more layers comprise an efficiency layer and a loading layer.

* * * * *